(12) United States Patent
Rommer et al.

(10) Patent No.: US 11,678,231 B2
(45) Date of Patent: Jun. 13, 2023

(54) NODE AND METHOD FOR MANAGING A DATA FLOW BETWEEN NETWORKS OF DIFFERENT ACCESS TYPES

(71) Applicant: Telefonaktiebolaget L M Ericsson (publ), Stockholm (SE)

(72) Inventors: Stefan Rommer, Vastra Frolunda (SE); Tomas Hedberg, Stockholm (SE); Dinand Roeland, Sollentuna (SE); Ivo Sedlacek, Hovorcovice (CZ); Mattias Tan Bergström, Stockholm (SE); Jari Vikberg, Jarna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 335 days.

(21) Appl. No.: 14/891,453

(22) PCT Filed: Nov. 10, 2015

(86) PCT No.: PCT/EP2015/076226
§ 371 (c)(1),
(2) Date: Nov. 16, 2015

(87) PCT Pub. No.: WO2016/075149
PCT Pub. Date: May 19, 2016

(65) Prior Publication Data
US 2016/0295465 A1    Oct. 6, 2016

Related U.S. Application Data

(60) Provisional application No. 62/077,727, filed on Nov. 10, 2014.

(51) Int. Cl.
*H04W 36/00*       (2009.01)
*H04W 76/16*       (2018.01)
(Continued)

(52) U.S. Cl.
CPC ......... *H04W 36/0022* (2013.01); *H04L 43/16* (2013.01); *H04W 36/0027* (2013.01); *H04W 76/16* (2018.02); *H04W 88/06* (2013.01)

(58) Field of Classification Search
CPC ........... H04W 36/0027; H04W 76/026; H04W 36/0022; H04W 88/06; H04W 76/16; H04L 43/16
See application file for complete search history.

(56) References Cited

U.S. PATENT DOCUMENTS 10,375,603 B2 *   8/2019  Bergstrom ............ H04W 24/02
2007/0049276 A1   3/2007  Rimoni et al.
(Continued)

FOREIGN PATENT DOCUMENTS

CN        2674799 Y    1/2005
CN      101091403 A   12/2007
(Continued)

OTHER PUBLICATIONS

Motorola Mobility et al., S2-142165, Usage of RAN assistance parameters in ANDSF rules, May 19-23, 2014, SA WG2 Meeting #103, whole document.*
(Continued)

*Primary Examiner* — Michael Thier
*Assistant Examiner* — Jose L Perez
(74) *Attorney, Agent, or Firm* — Rothwell, Figg, Ernst & Manbeck, P.C.

(57) ABSTRACT

Example embodiments presented herein are directed towards a wireless device and core network node, as well as corresponding methods therein, for managing a data flow between a network access type 1 and a network access type 2. According to some examples, access type 1 may be a
(Continued)

3GPP access and access type 2 may be a non-3GPP access. The wireless device is connectable to both the networks of access types 1 and 2.

14 Claims, 12 Drawing Sheets

(51) Int. Cl.
  *H04L 43/16* (2022.01)
  *H04W 88/06* (2009.01)

(56) References Cited

U.S. PATENT DOCUMENTS

| | | | |
|---|---|---|---|
| 2013/0016696 A1* | 1/2013 | Adjakple | H04W 72/52 370/328 |
| 2013/0121282 A1 | 5/2013 | Liu | |
| 2014/0254576 A1* | 9/2014 | Varma | H04W 48/16 370/338 |
| 2015/0029879 A1* | 1/2015 | Chou | H04W 72/042 370/252 |
| 2015/0078360 A1 | 3/2015 | Wang et al. | |
| 2015/0092553 A1* | 4/2015 | Sirotkin | H04W 48/16 370/235 |
| 2015/0195743 A1* | 7/2015 | Sirotkin | H04W 28/08 370/235 |
| 2015/0327114 A1* | 11/2015 | Gupta | H04W 28/0263 370/235 |
| 2015/0327129 A1* | 11/2015 | Faccin | H04W 36/00837 370/331 |
| 2015/0327153 A1* | 11/2015 | Tervonen | H04W 48/08 370/235 |
| 2015/0350954 A1* | 12/2015 | Faccin | H04W 28/0263 370/254 |
| 2015/0358876 A1* | 12/2015 | Liang | H04W 36/14 370/331 |
| 2015/0382269 A1* | 12/2015 | Liang | H04W 36/0083 370/332 |
| 2016/0044567 A1* | 2/2016 | Baghel | H04W 28/08 370/331 |
| 2016/0105828 A1* | 4/2016 | Lai | H04W 36/0077 370/331 |
| 2016/0119846 A1* | 4/2016 | Chou | H04W 72/0486 370/331 |
| 2016/0119870 A1* | 4/2016 | Chang | H04W 12/03 455/552.1 |
| 2016/0198399 A1* | 7/2016 | Kim | H04W 48/18 455/435.2 |
| 2016/0337960 A1* | 11/2016 | Nagasaka | H04W 36/30 |
| 2017/0019835 A1* | 1/2017 | Lee | H04W 40/248 |
| 2017/0026824 A1* | 1/2017 | Kim | H04W 72/0493 |
| 2017/0195918 A1* | 7/2017 | Lee | H04W 28/08 |
| 2017/0214592 A1* | 7/2017 | Wigard | H04L 43/16 |
| 2017/0251410 A1* | 8/2017 | Comstock | H04W 36/0066 |
| 2017/0310584 A1* | 10/2017 | Kim | H04L 45/22 |
| 2017/0310585 A1* | 10/2017 | Kim | H04L 47/20 |
| 2018/0027450 A1* | 1/2018 | Sirotkin | H04W 28/08 370/235 |
| 2019/0014529 A1* | 1/2019 | Karampatsis | H04W 40/02 |

FOREIGN PATENT DOCUMENTS

| | | | |
|---|---|---|---|
| CN | 101326851 A | 12/2008 | |
| CN | 102740361 A | 10/2012 | |
| CN | 103391633 A | 11/2013 | |
| WO | 2006/083620 A2 | 8/2006 | |
| WO | 2013/150500 A2 | 10/2013 | |
| WO | WO-2016004119 A1 * | 1/2016 | H04W 76/022 |

OTHER PUBLICATIONS

Huawei, Hisilicon, NB_IFOM Solution for S2a MCM, S2-142846, SA WG2 Meeting #104, Dublin, Ireland, Jul. 7-11, 2014, whole document (Year: 2014).*
Qualcomm Incorporated, (S2-141608 Revised functionality for current NB_IFOM TR), May 19-23, 2014, SA WG2 Meeting #103, whole document (Year: 2014).*
Karampatsis et al., U.S. Appl. No. 62/054,637 (provisional of US 2019/0014529 A1), filed Sep. 24, 2014, whole document (Year: 2014).*
Kim et al., U.S. Appl. No. 61/992,194 (provisional of US 2017/0026824 A1), filed May 12, 2014, whole document (Year: 2014 ).*
Kim et al., U.S. Appl. No. 62/060,539 (provisional of US 2017/0310585 A1), filed Oct. 6, 2014, whole document (Year: 2014).*
Chou et al., U.S. Appl. No. 62/067,451 (provisional of US 2016/0119846 A1), filed Oct. 23, 2014, whole document (Year: 2014).*
International Search Report and Written Opinion for International Patent Application No. PCT/EP2015/076226, dated Feb. 12, 2016, 15 pages.
Motorola Mobility et al., Usage of RAN assistance parameters in ANDSF rules, 3GPP Draft, S2-142165, May 19-23, 2014, Phoenix, AZ, USA, 7 pages.
Huawei et al., Traffic routing controlled by ISRP with RAN condition, 3GPP Draft, 01-142584, Jul. 14-18, 2014, Cape Town, South Africa, 4 pages.
ZTE, Network-initiated IP flow mobility for S2a, 3GPP Draft, S2-142450, Jul. 2, 2014, Sophia-Antipolis Cedex, France, 9 pages.
Huawei et al., NB_IFOM Solution for S2a MCM, 3GPP Draft, S2-142846, Jul. 7-11, 2014, Dublin, Ireland, 10 pages.
Ericsson, Co-existence between UE-init and NW-init NBIFOM as well as with RAN Rules solution, 3GPP Draft, S2-150086, Jan. 26-30, 2015, Sorrento, Italy, 8 pages.
Ericsson, Co-existence between NBIFOM and rel-12 "RAN Rules" solution, 3GPP Draft, S2-143962, Nov. 17-21, 2014, San Francisco, California, USA, 8 pages.
Second Written Opinion of the IPEA/EP for International Patent Application No. PCT/EP2015/076226, dated Sep. 23, 2016, 6 pages.
European Communication dated Jun. 8, 2018, issued in European Patent Application No. 15 794 144.4, 7 pages.
European Communication dated Nov. 2, 2018, issued in European Patent Application No. 15 794 144.4, 6 pages.
European Communication dated Mar. 14, 2019, issued in European Patent Application No. 15 794 144.4, 7 pages.
Chinese Office Action issued in Chinese Patent Application No. 201580060886.1, dated Aug. 26, 2019 (26 pages).
Ericsson, "Network-initiated IFOM using S2a and GTP", SA WG2 Meeting #104, S2-142364, Dublin, Ireland, Jul. 7-11, 2014 (8 pages).

* cited by examiner

NODE AND METHOD FOR MANAGING A DATA FLOW BETWEEN NETWORKS OF DIFFERENT ACCESS TYPES

CROSS-REFERENCE TO RELATED APPLICATIONS

This application is a 35 U.S.C. § 371 National Phase Entry Application from PCT/EP2015/076226, filed Nov. 10, 2015, and designating the United States, which claims priority to U.S. Provisional Application No. 62/077,727, filed Nov. 10, 2014. The contents of both applications are incorporated by reference.

TECHNICAL FIELD

Example embodiments presented herein are directed towards a wireless device and core network node, and corresponding methods therein, for managing a data flow between networks of different access types.

BACKGROUND

In a typical cellular system, also referred to as a wireless communications network, wireless terminals, also known as mobile stations and/or user equipment units communicate via a Radio Access Network (RAN) to one or more core networks. The wireless terminals can be mobile stations or user equipment units such as mobile telephones also known as "cellular" telephones, and laptops with wireless capability, e.g., mobile termination, and thus can be, for example, portable, pocket, hand-held, computer-comprised, or car-mounted mobile devices which communicate voice and/or data with radio access network.

The radio access network covers a geographical area which is divided into cell areas, with each cell area being served by a base station, e.g., a Radio Base Station (RBS), which in some networks is also called "NodeB" or "B node" or "Evolved NodeB" or "eNodeB" or "eNB" and which in this document also is referred to as a base station. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies. Long Term Evolution (LTE) together with Evolved Packet Core (EPC) is the newest addition to the 3GPP family.

In some instances, it is beneficial for a wireless device to access both a 3GPP based network and a WLAN based network. Having simultaneous access to both networks may be useful in lessening the load on a RAN node, e.g., a base station.

SUMMARY

Typically, the data flow between a 3GPP and WLAN based network is performed with the use of RAN assistance parameters that comprise threshold level information for 3GPP and/or WLAN based metrics. Such threshold information is typically provided on a per PDN basis. A need exists to provide a means of regulating the flow of information for the wireless device from the 3GPP based network and WLAN based network based on the actual data itself rather than the entire PDN connection. Thus, at least one example object of some of the example embodiments presented herein is to provide a means of managing a data flow for a wireless device between a 3GPP and WLAN based network, where the managing is based on the actual data and not the entire PDN connection.

At least one example advantage of some of the example embodiments presented herein is that some applications or services may be more sensitive to delay. Thus, a type of access may be chosen for data associated with a particular service or application. This helps reduce the load on the RAN more efficiently as less important traffic may be placed on the WLAN based network.

Accordingly, some of the example embodiments are directed towards a method, in a wireless device, for managing a data flow between a network of access type 1 and a network of access type 2. The wireless device is connectable to both the networks of access types 1 and 2. The method comprises receiving, from a RAN node, information related to the selection between access types 1 and 2. The method also comprises detecting, based on the information received, a need to change an access type currently is use by the wireless device. The method further comprises transmitting, to a core network node, a notification to change a current access type, of access types 1 and 2. The method also comprises receiving, from a core network node, routing rules, the routing rules comprising at least an IP filter indicating an identified access type, of access type 1 or 2, for an identified data flow. The method further comprises transmitting the data flow according to the received routing rules.

Some of the example embodiments are directed towards a wireless device for managing a data flow between a network of access type 1 and a network of access type 2. The wireless device is connectable to both the networks of access types 1 and 2. The wireless device comprises a communications unit configured to receive, from a RAN node, information related to the selection between access types 1 and 2. The wireless device further comprises a processing unit configured to detect, based on the information received, a need to change an access type currently in use by the wireless device. The wireless device comprises a communications unit configured to transmit, to a core network node, a notification to change a current access type, of access types 1 and 2. The communications unit is further configured to receive, from the core network node, routing rules, the routing rules comprising at least an IP filter indicating an identified access type, of access type 1 or 2, for an identified data flow. The communications unit is also configured to transmit the data flow according to the received routing rules.

Some of the example embodiments are directed towards a method, in a core network node, for managing a data flow of a wireless device between a network of access type 1 and a network of access type 2. The wireless device is connectable to both the networks of access types 1 and 2. The method comprises receiving, from the wireless device, a notification to change a current access type, of access types 1 and 2, currently used by the wireless device. The method further comprises determining, based on the received notification, routing rules comprising an IP filter indicating an identified access type, of access types 1 and 2, for an identified data flow. The method also comprises sending, to the wireless device, routing rules, the routing rules comprising an IP filter indicating the identified access type.

Some of the example embodiments are directed towards a core network node for managing a data flow of a wireless device between a network of access type 1 and a network of access type 2. The wireless device is connectable to both the networks of access types 1 and 2. The core network node comprises a communications unit configured to receive, from the wireless device, a notification to change a current access type, of access types 1 and 2, currently used by the wireless device. The core network node further comprises a processing unit configured to determine, based on the received notification, routing rules comprising an IP filter indicating an identified access type, of access types 1 and 2, for an identified data flow. The core network node comprises a communications unit configured to send, to the wireless device, routing rules, the routing rules comprising an IP filter indicating the identified access type.

DEFINITIONS

3GPP Third Generation Partnership Project
ANDSF Access Network Discovery and Selection Function
AP Access Point
AS Access Stratum
BSC Base Station Controller
CN Core Network
EcNo Energy per Chip over the Noise
E-UTRAN Evolved Universal Terrestrial Radio Access Network
eNB Evolved NodeB
eNodeB Evolved NodeB
EPC Evolved Packet Core
ePDG Evolved Packet Data Gateway
GERAN GSM/EDGE Radio Access Network
GGSN Gateway GPRS Support Node
GPRS General Packet Radio Service
GSM Global System for Mobile Communications
GW Gateway
HLR Home Location Register
HSS Home Subscriber Server
ID Identification
IFOM IP Flow Mobility
IMS IP Multimedia Subsystem
IMSI International Mobile Subscriber Identity
IP Internet Protocol
LTE Long Term Evolution
MME Mobility Management Entity
NBIFOM Network Based IFOM
NW Network
OPI Offloading Preference Indicator
PCRF Policy Control and Charging Rules Function
PDN Packet Data Network
PGW PDN Gateway
RAN Radio Access Network
RBS Radio Base Station
RNC Radio Network Controller
RRC Radio Resource Control
RSCP Reference Signal Code Power
RSRP Reference Signal Received Power
RSRQ Reference Signal Received Quality
RSSI Received Signal Strength Indication
SGSN Serving GPRS Support Node
SGW Serving Gateway
TWAG Trusted Wireless Access Gateway
UE User Equipment
UMTS Universal Mobile Telecommunications System
UTRAN UMTS Terrestrial Radio Access Network
VoLTE Voice over LTE
WCDMA Wideband Code Division Multiple Access
WLAN Wireless Local Area Network

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein.

It should be appreciated that the terms user equipment and wireless device may be used interchangeably. It should further be appreciated that while the example embodiments are described with the use of a PGW, any core network node may be used to provide the routing rules described herein. It should also be appreciated that the example embodiments are described with the use of access types 3GPP and WLAN. However, it should be appreciated that at least the following access type combinations may also utilize the example embodiments presented herein:

Access type 1: 3GPP, Access type 2: WLAN
Access type 1: 3GPP, Access type 2: fixed access (e.g., DSL, Fiber)
Access type 1: 3GPP, Access type 2: CDMA General overview Example embodiments presented herein are directed towards a wireless device and Packet Data Network Gateway (PGW), and corresponding methods therein, for managing a data flow between a 3GPP based network and a Wireless Local Area Network (WLAN) based network.

Figure 1:
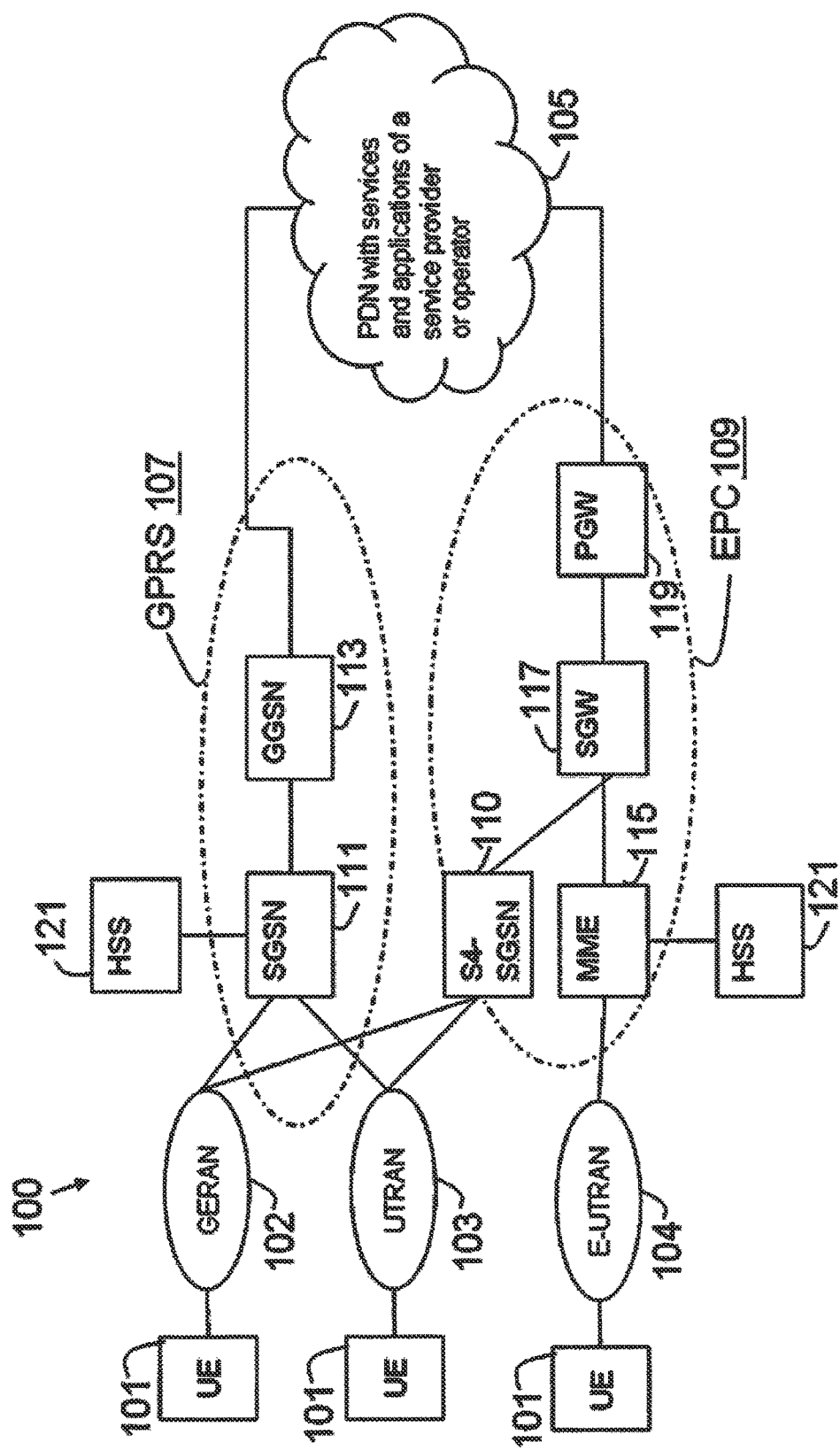
FIGS. 1-2 are illustrated examples wireless networks.

In order to provide a better explanation of the example embodiments presented herein, a problem will first be identified and discussed. FIG. 1 provides a general example of a communication network 100. As shown in FIG. 1, a user equipment (UE) 101 may be in communication with a Universal Terrestrial Radio Access Network (UTRAN) 103, an Evolved UTRAN (E-UTRAN) 104, or a GSM Edge Radio Access Network (GERAN) 102 subsystem in order to access communication to an operator or application server 105. In gaining access to SCS, AS or hosts 105, the UTRAN/E-UTRAN/GERAN subsystem 102-104 may be in communication with a General Packet Radio Service (GPRS) subsystem 107 or an Evolved Packet Core (EPC) subsystem 109. It should also be appreciated that the network may further comprise a WiFi subsystem, although not illustrated in FIG. 1.

The GPRS subsystem 107 may comprise a Serving GPRS Support Node (SGSN) 111, which may be responsible for the delivery of data packets to and from the mobile stations within an associated geographical service area. The SGSN 111 may also be responsible for packet routing, transfer, mobility management and connectivity management. The GPRS subsystem 107 may also include a Gateway GPRS Support Node 113, which may be responsible for the interworking between the GPRS subsystem 107 and the PDN 105.

The EPC subsystem 109 may comprise a Mobility Management Entity 115, which may be responsible for mobility management, connectivity management, idle mode UE tracking, paging procedures, attachment and activation procedures, and small data and message transfer. The EPC subsystem may also comprise a Serving Gateway (SGW) 117, which may be responsible for the routing and forwarding of data packets. The EPC subsystem may also include a Packet data network Gateway (PGW) 119, which may be responsible for providing connectivity from the user equipment 101 to one or more PDN(s) 105. Both the SGSN 111 and the MME 115 may be in communication with a Home Subscriber Server (HSS) 121, which may provide device identification information, an International Mobile Subscriber Identity (IMSI), subscription information, etc. It should be appreciated that the EPC subsystem 109 may also comprise a S4-SGSN 110, thereby allowing the GERAN 102 or UTRAN 103 subsystems to be accessed when the GPRS 107 is replaced by the EPC 109.

Figure 2:
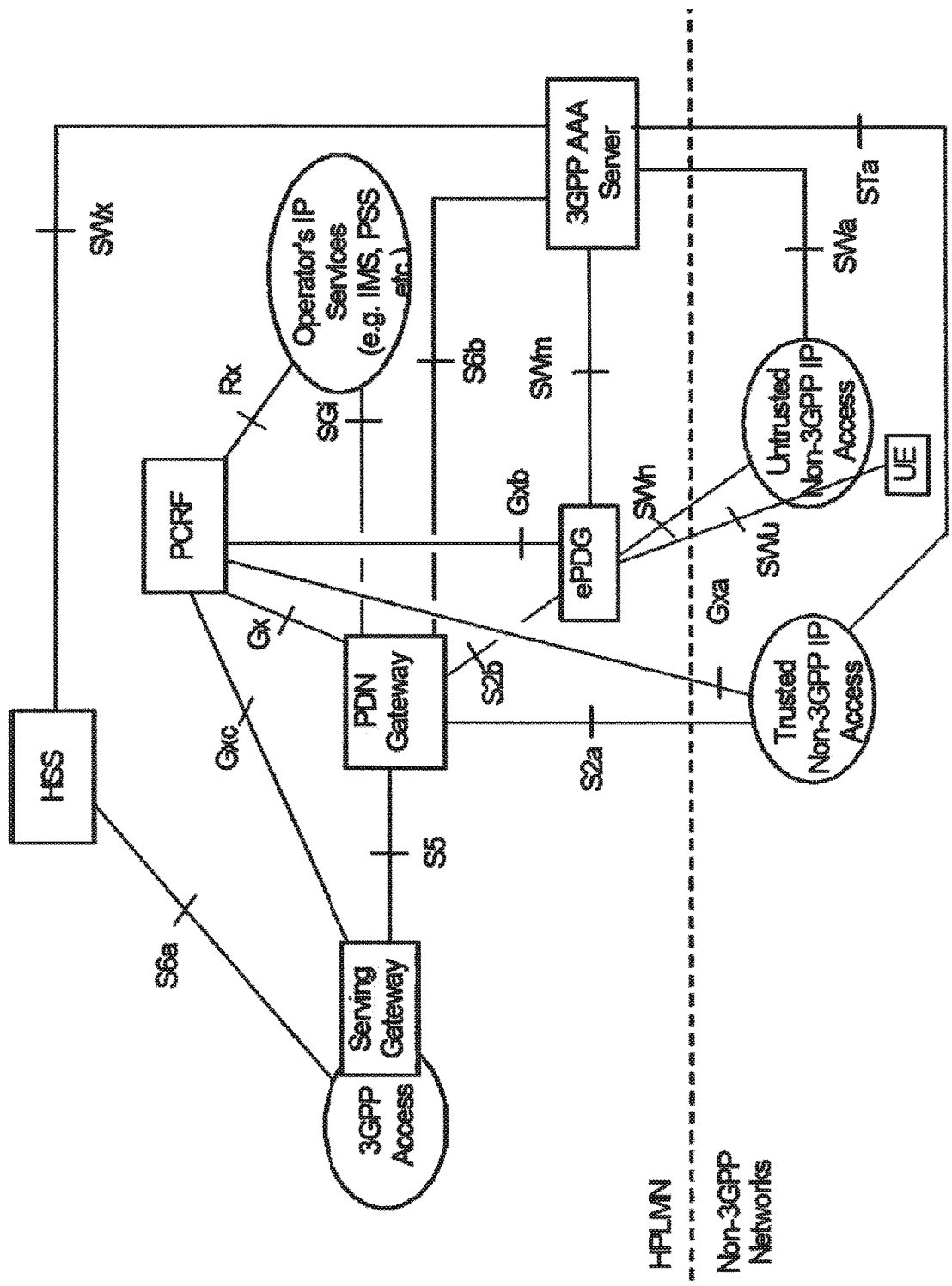

FIG. 2 shows an extension to the EPC architecture in order to allow also non-3GPP accesses. In such access the radio interface is not specified by 3GPP, e.g. WLAN. See 3GPP TS 23.402. A non-3GPP access may be trusted or untrusted. The exact definition of trusted or untrusted is given in the 3GPP specifications. Simplified, one can say that a trusted access is managed by an operator (e.g. an operator hotspot) whereas an untrusted access is not managed by the operator (e.g. a WiFi access point at home). In a non-3GPP access a security gateway called ePDG is used between the untrusted domain and the operator's network. The UE sets up a secure tunnel to the ePDG, and there is the S2b interface between ePDG and PGW. A trusted 3GPP access hosts a gateway, TWAG (see TS 23.402 section 16). There is a point-to-point interface between UE and TWAG, and the S2a interface between TWAG and PGW.

PDN Connections and Bearers

3GPP defines the concept of a PDN; a Packet Data Network. A PDN is in most cases an IP network, e.g. Internet or an operator IMS service network. A PDN has one more names; each name is defined in a string called APN (Access Point Name). The PGW is a gateway towards one or more PDNs. A UE may have one or more PDN connections. A PDN connection is a logical IP tunnel between UE and PGW, providing the UE access to a PDN. The setup of a PDN connection is initiated from the UE. Each PDN connection has a single IP address or prefix.

PDN connections can be setup over a 3GPP access (see e.g. TS 23.401 section 5.3.2 and 5.10.2) or over a non-3GPP access (see e.g. TS 23.402 section 7.2 and 16.2). A UE may have one or more PDN connections over a 3GPP accesses, or one or more PDN connections over a non-3GPP access, or both simultaneously.

Every PDN connection consists of one or more bearers. See TS 23.401 section 4.7.2 for a description of the bearer concept. A bearer uniquely identifies traffic flows that receive a common QoS treatment between a UE and a PGW. Each bearer on a particular access has a unique bearer ID. The bearer IDs assigned for a specific UE on S2a/S2b are independent of the bearer IDs assigned for the same UE on S5 and may overlap in value.

On the 3GPP access, the bearer is end-to-end between UE and PGW. The bearer ID is known by PGW, MME, eNB and UE. On the non-3GPP access, there is no bearer concept between UE and TWAG/ePDG. The bearer concept is only defined between PGW and TWAG/ePDG; i.e. it is only defined over S2a/S2b. In this case, the bearer ID is known by PGW and TWAG/ePDG but not by the UE. Regardless of access type, the PCRF is not aware of bearer IDs.

Every PDN connection has at least one bearer and this bearer is called the default bearer. All additional bearers on the PDN connection are called dedicated bearers.

IP Flow Mobility (IFOM)

IFOM is defined in 3GPP TS 23.402 and stands for IP flow mobility. An IFOM PDN connection is a special PDN connection that still has a single IP address/prefix but is routed over multiple accesses simultaneously. UE and PGW negotiate which IP flow gets routed over which access. 3GPP SA2 has an ongoing work item to define IFOM for S2a and S2b. The plan is to include this new functionality in 3GPP Release-13.

Even though an IFOM PDN connection may be routed over multiple accesses simultaneously, the bearers on each access within that PDN connection are independent of each other.

In order to negotiate which IP flow shall be routed over which access, routing rule update procedures are being defined. A routing rule update can be initiated either from the UE or from the PGW. A routing rule comprises the information needed by UE and PDN GW to decide over what access an IP flow shall be routed. The routing rule may e.g. comprise:
- IP filters describing the IP flow,
- an access type describing what access shall be used for the IP flow, and
- a precedence indicating what IP filters have precedence in case of IP filters in different routing rules are overlapping.

A routing rule could also be more complex, e.g. containing multiple access types in a priority order.

Exemplary call flows for network-initiated routing rule update procedures for S2a can be found in http://www.3gpp.org/ftp/tsg_sa/WG2_Arch/TSGS2_104_Dublin/Docs/S2-142364.zip. Exemplary call flows for network-initiated and UE-initiated routing rule update procedure for S2a and S2b can be found in http://www.3gpp.org/ftp/tsg_sa/WG2_Arch/TSGS2_104_Dublin/Docs/S2-142449.zip.

In addition to the "explicit" routing rule described above for controlling IP flow mobility, it is also possible to signal IP flow mobility requests in a more "implicit" way. As described e.g. in TR 23.861, one option is to signal an IP Flow mobility request by sending a user-plane IP packet with the same IP header as the IP flow. In this case there is no separate information elements for IP filter, access type or precedence included in the "routing rule". Instead the IP filter is carried by the normal IP header and the access type is the access type where the user-plane IP packet is sent.

IFOM will most probably support both UE-initiated IP flow mobility and network-initiated IP flow mobility. In the UE-initiated case, the UE sends IP flow mobility request(s) to the network and requests the handover of one or more IP flows. The UE may e.g. base its decisions on received ANDSF policies or on user preferences. In the NW-initiated case, it is the PDN GW that sends the IP flow mobility request(s) to the UE. The PDN GW may e.g. its decisions on information/triggers received from PCRF or other network entities. UE-initiated and NW-initiated IP flow mobility may co-exist on the same PDN Connection.

In addition to routing IP flows based on individual routing rules, the UE and PGW will also have a default access. This is the access used for all traffic (IP flows) that does not match a specific routing rule. The default access may e.g. be negotiated between UE and PGW when adding an access to an existing PDN Connection.

RAN Level Integration

3GPP has specified a feature/mechanism in 3GPP Release 12 for WLAN/3GPP Radio interworking which improves operator control with respect to how a UE performs access selection and traffic steering between 3GPP and WLANs belonging to the operator or its partners (it may even be so that the mechanism can be used for other, non-operator, WLANs as well, even though this is not the main target).

In this feature, the 3GPP RAN provides the UE with "RAN Assistance Parameters". The RAN assistance parameters are composed of three main components, namely threshold values, offloading preference indicator (OPI) and WLAN identifiers. The thresholds values could be for example for metrics such as 3GPP signal related metrics RSRP/RSRQ/RSCP/EcNo, WLAN signal related metrics such as RSSI, WLAN load/utilization, WLAN backhaul load/capacity, etc.

The feature can work both when using the Access Network Discovery and Selection Function (ANDSF) to control access selection and traffic steering, and without ANDSF. When using ANDSF, the ANDSF policies may comprise conditions related to the RAN Assistance Parameters so that traffic is e.g. only moved to WLAN if certain conditions related to the RAN-provided thresholds are fulfilled.

When ANDSF is not used, the UE instead uses "RAN rules" programmed into the UE that make use of the RAN assistance parameters. There are "RAN rules" defined both for moving traffic from 3GPP access to WLAN access, and for moving traffic from WLAN access to 3GPP access. The RAN Assistance Parameters are used by the UE when evaluating "RAN rules". Depending on the evaluation of these RAN rules, the UE decides whether or not to connect to WLAN access, and whether to steer traffic to or from WLAN access. One example of a RAN rule that uses the threshold value could be that the UE should move traffic to a WLAN if the RSRP is below the signaled RSRP threshold at the same time as the WLAN RSSI is above the signaled RSSI threshold. In a similar way RAN assistance parameters are used to control when the UE should steer traffic back from WLAN to 3GPP. The RAN rules/policies are specified in a 3GPP specification such as TS 36.304 v12.0.0 and/or TS 36.331 v12.1.0.

Further details on the thresholds and RAN rules are provided below.

The following thresholds have been defined for LTE in TS 36.304 (similar thresholds are also defined for UMTS):

$Thresh_{ServingOffloadWLAN, LowP}$
This specifies the RSRP threshold (in dBm) used by the UE for traffic steering to from E-UTRAN to WLAN.

$Thresh_{ServingOffloadWLAN, HighP}$
This specifies the RSRP threshold (in dBm) used by the UE for traffic steering from WLAN to E-UTRAN.

$Thresh_{ServingOffloadWLAN, LowQ}$
This specifies the RSRQ threshold (in dB) used by the UE for traffic steering from E-UTRAN to WLAN.

$Thresh_{ServingOffloadWLAN, HighQ}$
This specifies the RSRQ threshold (in dB) used by the UE for traffic steering from WLAN to E-UTRAN.

$Thresh_{ChUtilWLAN, Low}$
This specifies the WLAN channel utilization (BSS load) threshold used by the UE for traffic steering from E-UTRAN to WLAN.

$Thresh_{ChUtilWLAN, High}$
This specifies the WLAN channel utilization (BSS load) threshold used by the UE for traffic steering from WLAN to E-UTRAN.

$Thresh_{BackhRateDLWLAN, Low}$
This specifies the backhaul available downlink bandwidth threshold used by the UE for traffic steering from WLAN to E-UTRAN.

$Thresh_{BackhRateDLWLAN, High}$
This specifies the backhaul available downlink bandwidth threshold used by the UE for traffic steering from E-UTRAN to WLAN.

$Thresh_{BackhRateULWLAN, Low}$
This specifies the backhaul available uplink bandwidth threshold used by the UE for traffic steering from WLAN to E-UTRAN.

Thresh$_{BackhRateULWLAN, High}$
This specifies the backhaul available uplink bandwidth threshold used by the UE for traffic steering from E-UTRAN to WLAN.

Thresh$_{BeaconRSSIWLAN, Low}$
This specifies the Beacon RSSI threshold used by the UE for traffic steering from WLAN to E-UTRAN.

Thresh$_{BeaconRSSIWLAN, High}$
This specifies the Beacon RSSI threshold used by the UE for traffic steering from E-UTRAN to WLAN.

In addition a timer value is defined:

Tsteering$_{WLAN}$
This specifies the timer value Tsteering$_{WLAN}$ during which the rules should be fulfilled before starting traffic steering between E-UTRAN and WLAN.

Examples of "RAN rules" are shown below:

Rule 1: The UE moves traffic from E-UTRAN to WLAN if conditions 1 and 2 below are satisfied for a time interval Tsteering$_{WLAN}$:
1. In the E-UTRAN serving cell:
RSRPmeas<Thresh$_{ServingOffloadWLAN, LowP}$; or
RSRQmeas<Thresh$_{ServingOffloadWLAN, LowQ}$;
2. In the target WLAN:
ChannelUtilizationWLAN<Thresh$_{ChUtilWLAN, Low}$; and
BackhaulRateDIWLAN>Thresh$_{BackhRateDLWLAN, High}$; and
BackhaulRateUIWLAN>Thresh$_{BackhRateULWLAN, High}$; and
BeaconRSSI>Thresh$_{BeaconRSSIWLAN, High}$;

Rule 2: The UE moves traffic from WLAN to E-UTRAN if the following conditions 3 and 4 are satisfied for a time interval Tsteering$_{WLAN}$:
1. In the source WLAN:
ChannelUtilizationWLAN>Thresh$_{ChUtilWLAN, High}$; or
BackhaulRateDIWLAN<Thresh$_{BackhRateDLWLAN, Low}$; or
BackhaulRateUIWLAN<Thresh$_{BackhRateULWLAN, Low}$; or
BeaconRSSI<Thresh$_{BeaconRSSIWLAN, Low}$;
2. In the target E-UTRAN cell:
RSRPmeas>Thresh$_{ServingOffloadWLAN, HighP}$; and
RSRQmeas>Thresh$_{ServingOffloadWLAN, HighQ}$;

Similar "RAN rules" are defined for UMTS.

In addition to providing the RAN Assistance Parameters from the RAN to the UE, the network also informs the UE about what PDN Connections are offloadable to WLAN and what PDN Connections are not offloadable and should remain in 3GPP access. For example, an operator may desire that the PDN Connection for IMS (VoLTE) remains in 3GPP access while the PDN Connection for general Internet access may be moved to WLAN access. This indication is hereafter referred to as an "offloadability" indication. In the solution specified by 3GPP in rel-12, this "offloadability" indication is provided to the UE via NAS (Non-Access Stratum) signaling from the MME or SGSN to the UE.

The RAN rules are applied by the UE in such a way that when the RAN rule for moving traffic to WLAN is fulfilled, the UE moves all PDN Connections marked as "offloadable" to WLAN while any non-offloadable PDN Connections stays on 3GPP access. When the RAN rule for moving traffic to 3GPP access is fulfilled, the UE moves the PDN Connections active on WLAN to 3GPP access.

A limitation of the rel-12 solution is that only PDN Connection level mobility is supported, i.e. the UE can move the PDN Connection between WLAN and 3GPP access, controlled by the RAN rules. However, the RAN cannot control IP flow mobility as being worked on in the rel-13 IFOM work item.

With the above mechanism it is likely not wanted, or maybe not even feasible, that the terminal considers any WLAN when deciding where to steer traffic. For example, it may not be feasible that the terminal uses this mechanism to decide to steer traffic to a WLAN not belonging to the operator. Hence it has been proposed that the RAN should also indicate to the terminal which WLANs the mechanism should be applied for by sending WLAN identifiers.

Figure 3:
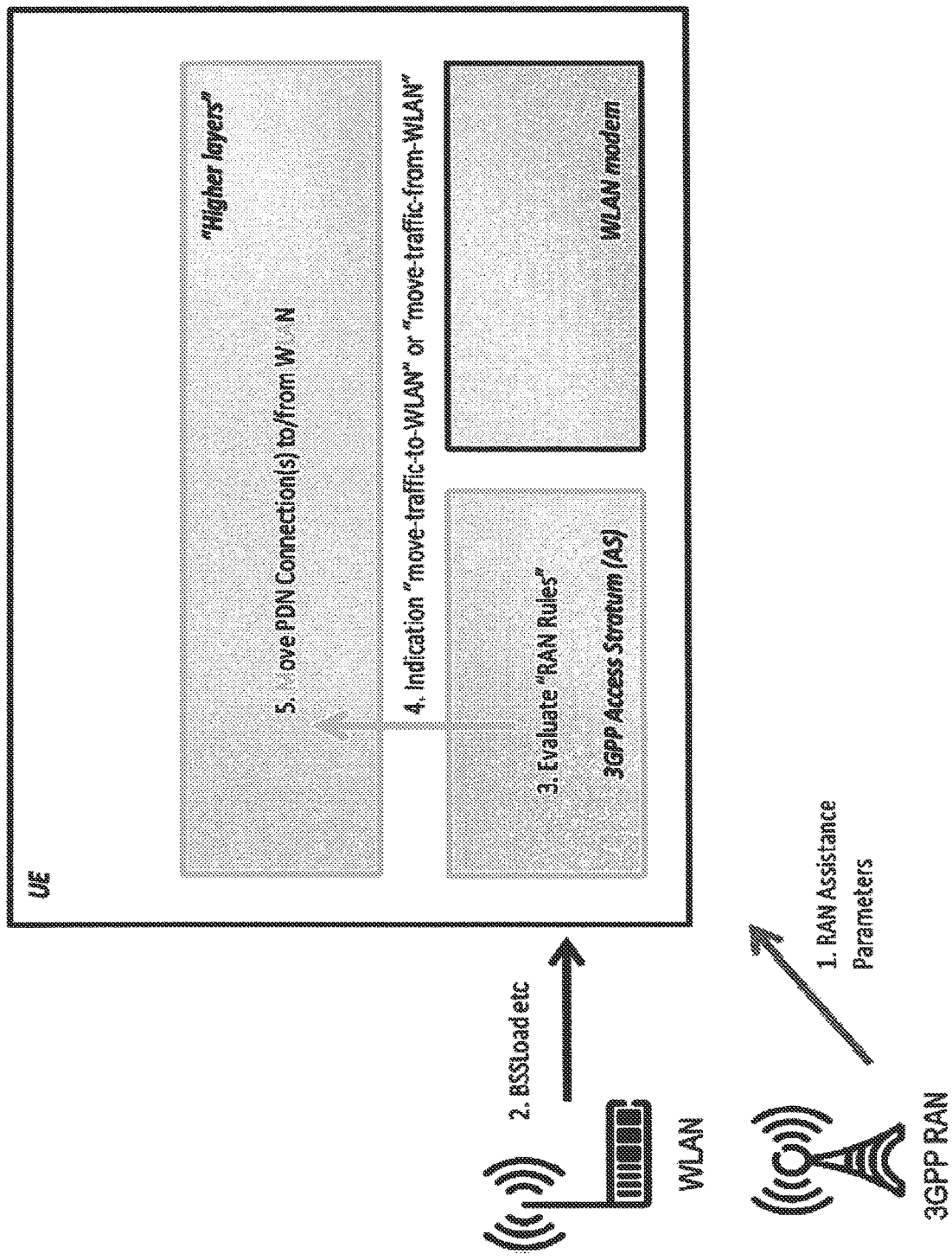
FIG. 3 is an example illustration of how a wireless device may implement RAN assistance parameters.

FIG. 3 provides an example of how this may be implemented in the UE, where the 3GPP Access Stratum (AS) evaluates the RAN Rules based on the received RAN Assistance Parameters, measured radio properties (e.g. signal strength in 3GPP access and WLAN access) and additional parameters. Depending on the outcome, the AS may provide an indication to higher layers whether traffic should be moved to or from WLAN. The higher layers use this indication as a trigger for performing handover of the "offloadable" PDN Connection(s).

The RAN may also provide additional parameters that are used in ANDSF policies. One proposed parameter is offloading preference indicator (OPI). One possibility for OPI is that it is compared to a threshold in the ANDSF policy to trigger different actions, another possibility is that OPI is used as a pointer to point and, and select, different parts of the ANDSF policy which would then be used by the terminal.

The RAN assistance parameters (i.e. thresholds, WLAN identifiers, OPI) provided by RAN may be provided with dedicated signaling and/or broadcast signaling. Dedicated parameters can only be sent to the terminal when having a valid RRC connection to the 3GPP RAN. A terminal that has received dedicated parameters applies dedicated parameters; otherwise the terminal applies the broadcast parameters. If no RRC connection is established between the terminal and the RAN, the terminal cannot receive dedicated parameters.

In 3GPP, it has also been agreed that ANDSF should be enhanced for release-12 to use the thresholds and OPI parameters that are communicated by the RAN to the UE. More information on the ANDSF enhancements to support OPI and thresholds can be found in TS 23.402. If enhanced and valid ANDSF policies are provided to the UE, the UE will use the ANDSF policies instead of the RAN rules/policies (i.e. ANDSF has precedence). More detailed description for when RAN rules/policies are used and when ANDSF policies are used can be found in TS 23.402.

As a further enhancement to the RAN rules it has been discussed to introduce an access network selection and/or traffic steering mechanism based on measurement reports and traffic steering commands. This will be described in the section below.

Traffic Steering Command Based Approach

Figure 4:
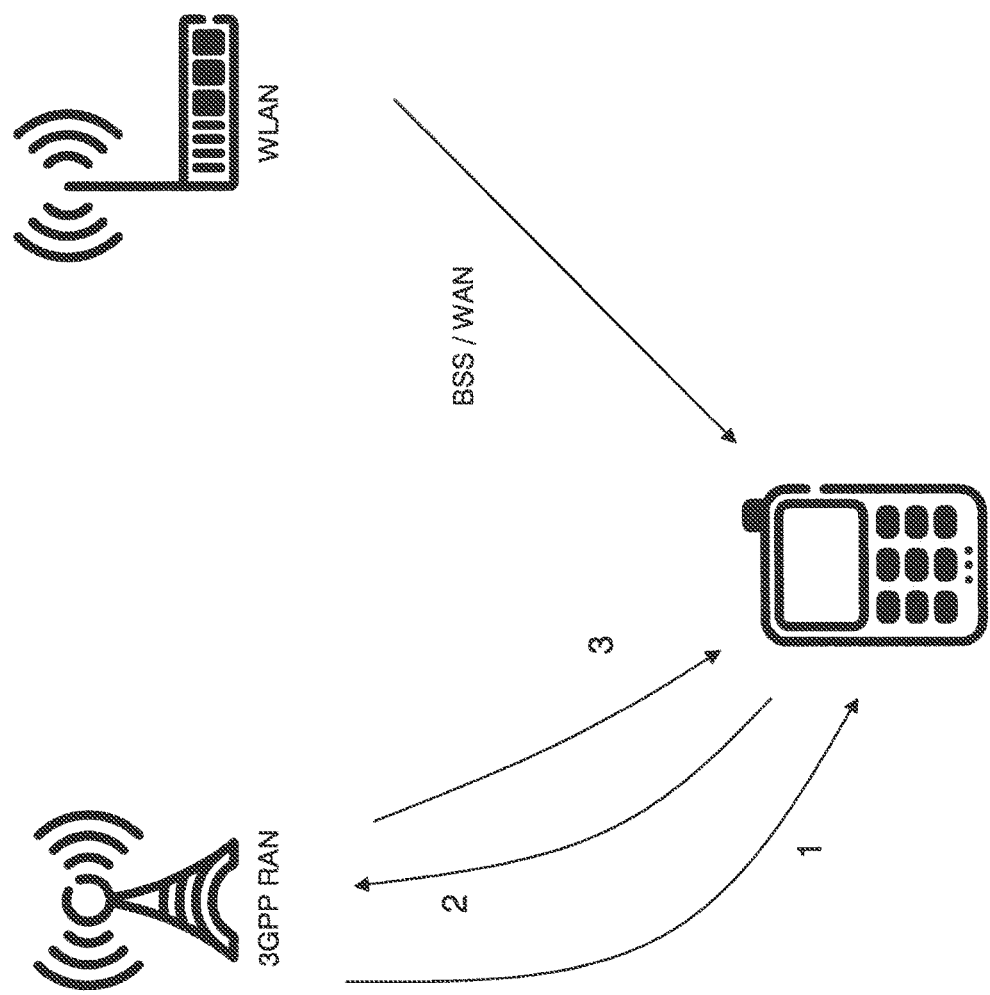
FIG. 4 is a signalling interaction of a wireless device connectable between a 3GPP and WLAN based networks.

FIG. 4 illustrates is another alternative for performing traffic steering between 3GPP and WLAN which is based on measurement reporting from the terminal and traffic steering commands sent to the terminal from the 3GPP RAN procedure.

Step 1:

In step 1, the 3GPP RAN provides the UE with a set of conditions and thresholds and the UE should then start to scan and measure WLAN. This step may occur before there is WLAN coverage e.g. when load-balancing may be considered.

This step reduces battery consumption of the UE as it can avoid unnecessary scanning and measurements on the WLAN The conditions and thresholds could for example be that RSSI of WLAN should be above X dBm, 3GPP RSRP should be below Y dBm and/or BSS load (as advertised by WLAN) should be below Z.

RSSI>X
RSRP<Y
BSS load<Z

Step 2:

If the conditions specified in step 1 are met, the UE should send a measurement report containing the results of the discovery of APs. This is represented by step 2.

The 3GPP RAN will evaluate the reported results from the UE, considering also any other reports and information the network may have available, such as backhaul congestion, delay, subscription information and interference, and determines whether or not to steer the UE's traffic to WLAN.

Step 3:

If the 3GPP RAN decides it is suitable that the traffic of a particular UE should be re-directed to WLAN than step 3 is executed. The re-direction may contain a specific target, such as a prioritized AP/WLAN network or it could be just a command telling the UE to steer its traffic to WLAN and the UE and WLAN will decide to which particular AP the UE would use.

The third step is the actual traffic steering command sent from the 3GPP RAN to the UE. It contains necessary information so that the UE can initiate traffic steering according to mechanisms developed or to be developed in CT and SA groups.

Overview of the Example Embodiments

With the introduction of IFOM in release 13 it is not clear that the NBIFOM feature can co-exist and benefit from the RAN-based access selection and steering unless ANDSF is used.

As described above, when ANDSF is not used, the RAN-based solution is operating on a per-PDN-Connection level, controlling the steering of complete PDN Connections between 3GPP access and WLAN. IFOM on the other hand operates on IP flow level, i.e. supporting mobility of individual IP flows (within PDN Connections) between 3GPP access and WLAN. There is currently no solution for how to combine NBIFOM with rel-12 RAN-based traffic steering without ANDSF.

In particular, the current proposal in 3GPP is that movement of an IP Flow takes place when the message for IP flow handover is sent, e.g. when the Routing Rule is sent by the UE or by the PDN GW. In particular, when the PGW sends an IP flow handover request to the UE, the UE is assumed to accept the request and move the IP flow to target access immediately. An exception is e.g. in case the UE just lost coverage and cannot move the IP flow to target access. In this case the UE may reject the IP flow handover request. The UE does not take into account the "RAN rules" in such an IP flow handover.

The example embodiment presented herein provide a means where RAN control of IP flow mobility (IFOM) is supported by adding RAN control aspects to IFOM.

The example embodiments presented herein provide that a UE inform the PGW when a need exists to change a currently used access type. This is performed by sending a notification to the PGW. The PGW may then update routing rules with this in account and send such routing rules to the UE for data flow management.

According to some of the example embodiments, the UE takes into account the RAN Assistance Parameters when receiving a IP Flow handover request (e.g. a Routing Rule update) from PGW for moving traffic to WLAN. The UE shall only move the IP flow to WLAN if the RAN Rule for "move traffic to WLAN" is satisfied. When receiving a IP Flow handover request for moving traffic to 3GPP access, the UE shall move the IP flow to 3GPP access independent of the RAN Rule status.

If the RAN Rule for moving traffic to WLAN is not satisfied when the IP Flow handover request is received by the UE, the IP flow is instead routed over 3GPP access.

In this case two alternatives are described:

1: In one case the UE simply rejects the Routing Rule, possibly with a special cause code that the Routing Rule update is rejected because the RAN Rule is not satisfied. The network may later send the IP Flow handover request again for moving traffic to WLAN.

2: Another option is that the UE acknowledges the Routing Rule but replies with a cause code to the network that the IP flow is routed over 3GPP access. Later, if/when the RAN Rule for moving traffic to WLAN becomes satisfied, the UE sends a message to the network informing the network that the IP flow can be moved to WLAN. The UE and PGW then moves the IP Flow to WLAN.

In addition the UE takes the RAN Assistance Parameters into account to select the default access type for use with NBIFOM.

An example advantage of the example embodiments presented herein is that the example embodiments require no impact to RAN specifications and works with the RAN Assistance Parameters and "RAN Rules" defined in rel-12. Furthermore, the RAN-based traffic steering solution without ANDSF may be utilized also for IP Flow mobility. Otherwise, ANDSF is required in order to allow RAN control as per rel-12 for NBIFOM. Additionally, no impact to rel-12 RAN specifications, 3GPP RAN or UE Access Stratum. Only NBIFOM specifications and the NBIFOM implementation are impacted.

In the sections below different parts of the example embodiments are described with respect to providing different alternatives for providing the IP flow handover request and controlling the use of RAN Rule. Under the subheading 'General principles', general principles are described. Under the subheading 'Call flow for receiving the IP flow handover request in the UE', the IP Flow handover request from network to UE is described. Under the subheading 'Handling of the case where the RAN rule for moving traffic to WLAN is not satisfied', additional details for how to handle the case where the RAN Rule is not satisfied when receiving the IP Flow handover request. Under the subheading, 'Signaling IP flow handover request allowing RAN control', additional variants for how the core network can control whether RAN Rules are applied or not.

It should be noted that even though it will in this document be used as an example that "RAN rules" are used to determine when to apply a routing rule, it would equally well be possible to apply another interworking RAN mechanism such as the one based on traffic steering commands described under the subheading 'Traffic steering command based approach'. The key aspect is that the RAN controls when the UE shall move traffic to WLAN or move traffic to 3GPP access.

General Principles

Figure 5:
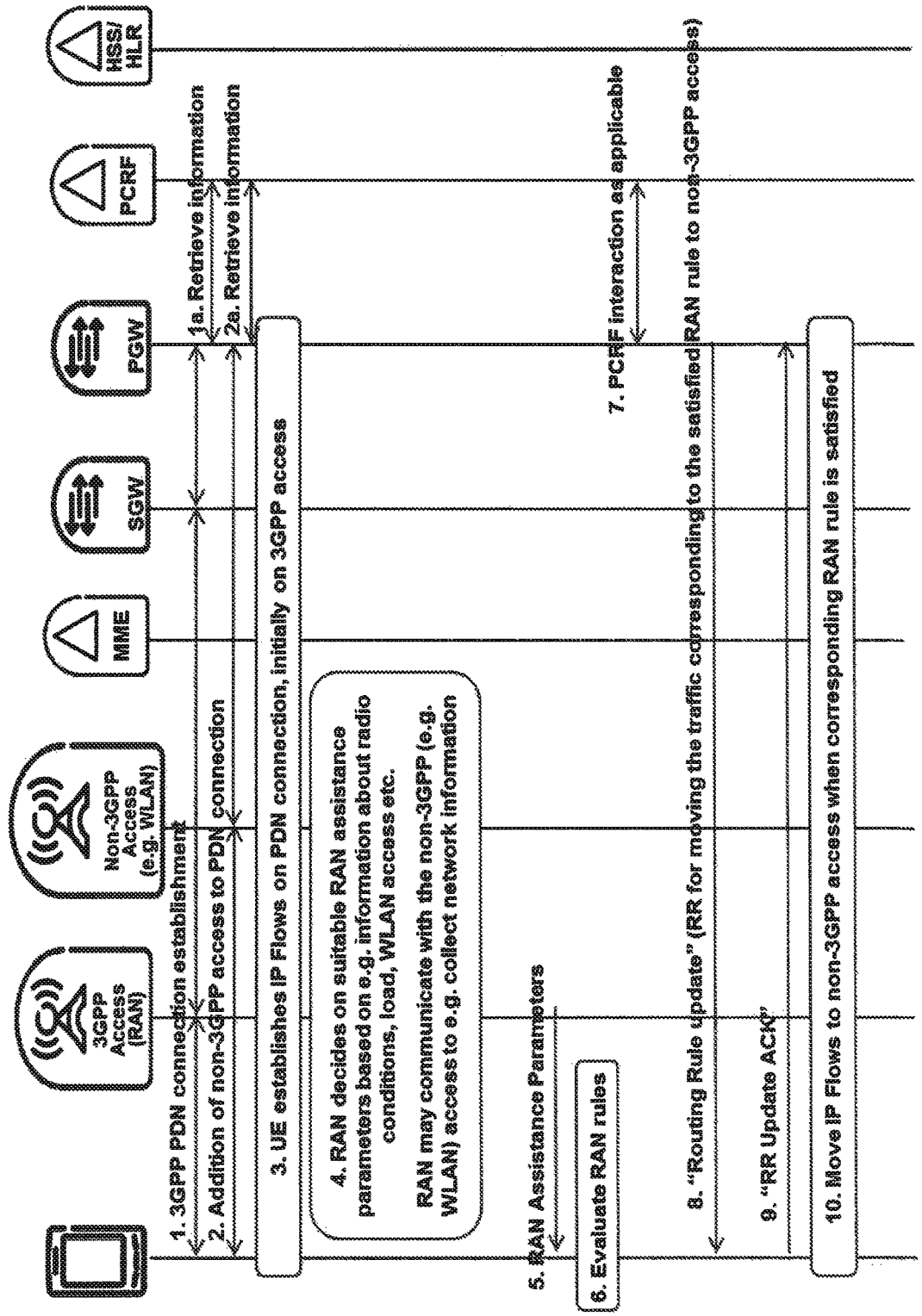
FIGS. 5 and 6 are messaging diagram of a flow handover, according to some of the example embodiments presented herein.

The general principles for applying RAN Rules to PDN Connections with NW-20 initiated NBIFOM are as follows:

1. When the 3GPP RAN provides RAN Assistance Parameters and the UE lower layer (access stratum) indicates "move traffic to WLAN", then:
    a. all IP flows that match existing Routing Rules with target access type WLAN are routed over WLAN. This can be achieved in two ways:
        i. Alt 1a.1: Either the UE informs PGW that access stratum indicates "move traffic to WLAN" and then PGW can update the Routing Rules using a PGW-initiated Routing Rule update procedure.
        ii. Alt 1a.2: Or the UE performs a UE-initiated Routing Rule update. In the latter case the UE may also include a cause code indicating that the reason for the update is that access stratum has indicated "move traffic to WLAN",
    b. if the UE receives a Routing Rule update from PGW with access type WLAN, the UE accepts it and routes the IP flow on WLAN
2. When the 3GPP RAN provides RAN Assistance Parameters and lower layer (access stratum) indicates "move traffic from WLAN", then:
    a. all IP flows running on WLAN are moved to 3GPP access. This can be achieved in two ways:
        i. Alt 2a.1: Either the UE informs PGW that access stratum indicates "move traffic from WLAN" and then PGW can update the Routing Rules using a PGW-initiated Routing Rule update procedure.
        ii. Alt 2a.2: Or the UE performs a UE-initiated Routing Rule update. In the latter case the UE may also include a cause code indicating that the reason for the update is that access stratum has indicated "move traffic from WLAN",
    b. if the UE receives a Routing Rule update from PGW with access type WLAN, then either
        i. Alt 2b.1: Either the UE rejects it and provides a suitable cause code to PGW indicating that the reason was rejected due to access stratum indicating move-from-WLAN,
        ii. Alt 2b.2: Or the UE accepts it, but routes the IP flow on 3GPP access. In this case the UE provides a reply to PGW indicating that the access stratum indicating move-from-WLAN and/or that the IP flow is routed on 3GPP access.
        NOTE: Further details on alternatives 2b.1 and 2b.2 is provided under the subheading 'Handling of the case where the RAN rule for moving traffic to WLAN is not satisfied'.
3. The UE keeps all IP flows on 3GPP access that match Routing Rules with target access type 3GPP. This is independent of the indication from access stratum.
4. If the 3GPP RAN does not provide RAN Assistance Parameters and/or the lower layer (access stratum) has not indicated any outcome of the RAN rule evaluation, the same behavior applies as described in the individual NBIFOM signaling solutions. In particular, if the IP Flow handover request (e.g. Routing Rule update) is accepted by the UE, the IP flow is routed over the access type indicated by PGW.
5. The default access type value can be treated in a similar way as the Routing Rule. I.e. if the PGW indicated that the default access is WLAN, then:
    a. When UE lower layer (access stratum) indicates "move traffic to WLAN", the UE may either provide an indication to PGW that access stratum indicates "move traffic to WLAN" and let PGW select a new default access type value (corresponding to alt 1a.1) or request that the default access is set to WLAN (corresponding to aft 1a.2).
    b. When UE lower layer (access stratum) indicates "move traffic from WLAN", the UE may either provide an indication to PGW that access stratum indicates "move traffic from WLAN" and let PGW select a new default access type value (corresponding to aft 2a.1) or request that the default access is set to 3GPP (corresponding to alt 2a.2).
    c. When PGW indicates that the default access type value is 3GPP, this value is kept independent of the indications from access stratum Call Flow for Receiving the IP Flow Handover Request in the UE FIG. 5 illustrates an example call flow where a Routing Rule is installed/updated. NOTE: Step 5 is done whenever RAN sends RAN Assistance Parameters. It is thus done asynchronously with the rest of the steps and may take place continuously and at any time. The same applies to step 6.

The novel steps are described below:

Step 8: The PGW sends a IP Flow handover request to the UE. The request includes either an indication that traffic shall be moved to WLAN, and/or an explicit indication that access type selection for the IP flow is to be determined by the RAN Rule.

Step 9: The UE sends an acknowledgement indication what Routing Rules are accepted/rejected.

The UE may also indicate the result of the RAN rule evaluation, i.e. whether the UE applies move-traffic-to-WLAN or move-traffic-from-WLAN. (The indication of the result of the RAN Rule evaluation may be provided separately after step 9). Alternatively the UE indicates what access type will be used for the IP flow depending on how the RAN Rules are evaluated. For example, if the evaluation in step 6 has indicated that traffic shall be moved to WLAN, the UE indicates in step 9 that the IP flow will be carried on WLAN access.

Step 10: Assuming that the RAN Rule for moving traffic to WLAN is satisfied, the UE moves the up-link part of the IP flow to the target access as determined above. Similarly the PGW moves the down-link part of the IP flow traffic to the target access based on the information received in step 9.

Handling of the Case Where the RAN Rule for Moving Traffic to WLAN is Not Satisfied In case the UE receives an IP flow handover request as described under the subheading 'Call flow for receiving the IP flow handover request in the UE', but the RAN rule for moving traffic from WLAN is last RAN Rule satisfied, (or that the UE has received a command indicating that the UE shall steer traffic from WLAN to 3GPP) there are at least two alternatives for how to handle this case:

Alternative 1—Reject with re-transmit: In this alternative the UE rejects the Routing Rule update with a suitable cause code if the Routing Rule update directs traffic to WLAN but the access stratum has indicated that traffic shall be moved from WLAN. The PGW can then re-send the Routing Rule update at a later stage. In this alternative, it only makes sense for PGW to send a Routing Rule for moving a flow to WLAN when S2a or S2b interface is available. It is thus assumed that the UE connects to WLAN when the RAN Rule for moving traffic to WLAN is fulfilled.

Alternative 2—Apply the Routing Rule in UE but with access type selected by RAN: In this alternative the UE does not reject the Routing Rule update if the Routing Rule update directs traffic to WLAN but the access stratum has indicated that traffic shall JO be moved from WLAN. Instead the UE installs the Routing Rule, routes traffic over 3GPP access and replies to PGW with a cause code indicating that the traffic is carried over 3GPP access. Later, when the access stratum indicates that traffic shall be moved to WLAN, the UE moves traffic to WLAN access. In order to allow the PGW to also direct down-link traffic over WLAN, the UE sends a notification (e.g. Routing Rule update) to PGW indicating that the traffic is now carried over WLAN.

Below alternatives 1 and 2 are described in further detail below.

Alternative 1

Figure 6:
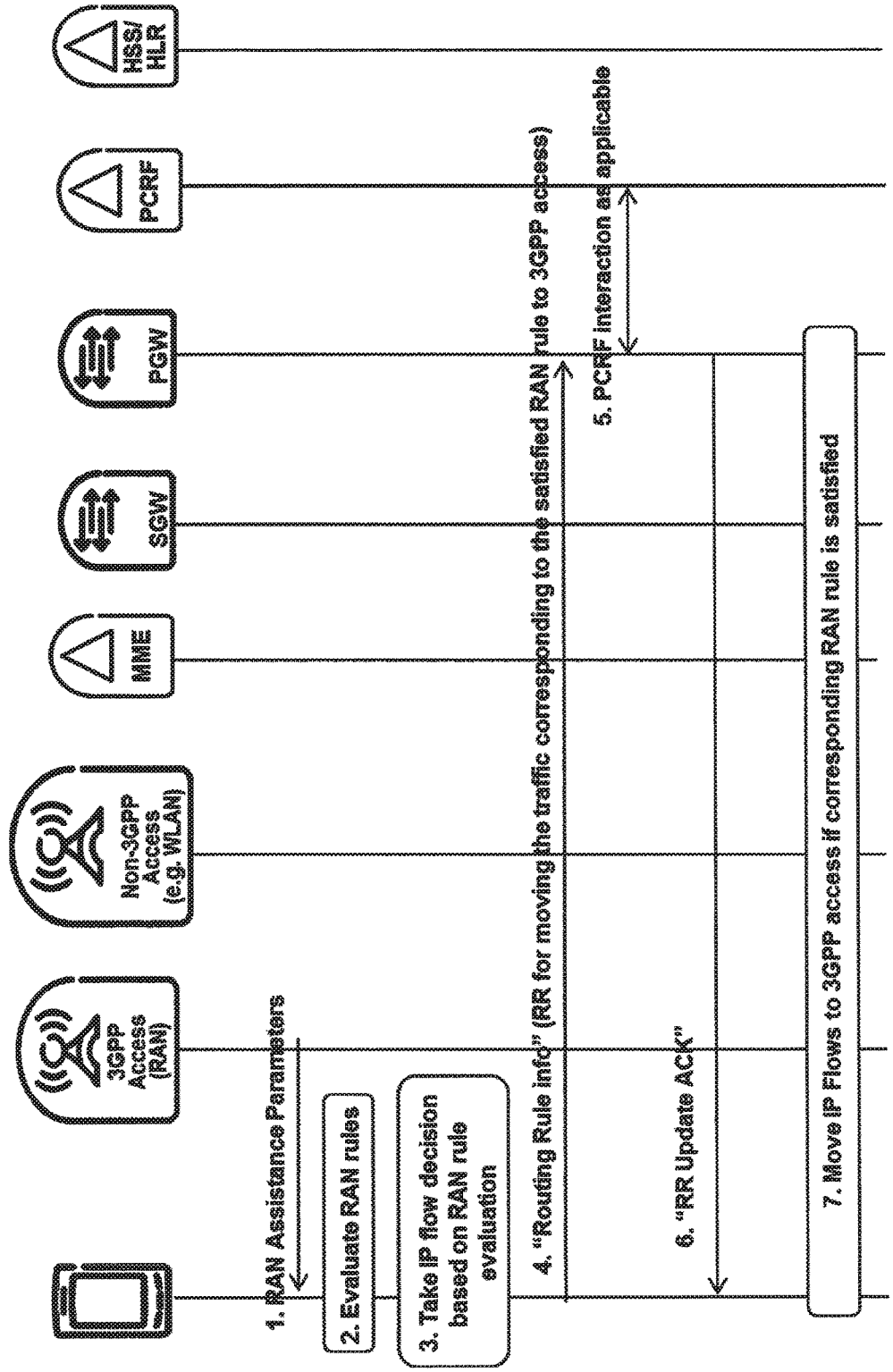

In this case the UE keeps the Routing Rule information base on the received IP flow handover request and initiates a IP flow handover when the RAN Rule for moving traffic to
WLAN becomes satisfied. An example call flow for IP flow handover based on change in RAN rule indication is provided in FIG. 6.

NOTE: Step 1 is done whenever RAN sends RAN Assistance Parameters. It is thus done asynchronously with the rest of the steps and may take place continuously and at any time. The same applies to step 2.

The novel steps are:

Step 3: The UE uses the outcome of the RAN rule evaluation to decide what Routing Rules are impacted, i.e. what IP flows that need to be moved to another access.

Step 4: The UE provides a IP flow mobility information message (e.g. Routing rule update) to the PGW indicating what IP flows/Routing Rules will be moved to another access. Alternatively the UE provides an indication that the RAN Rule for moving traffic to WLAN is satisfied.

Step 5: The PGW may inform the PCRF about the IP flow handovers. The PCRF acknowledges the information and may optionally include information about what IP flow handovers are accepted/rejected.

Step 6: The PGW provides an acknowledgement to the UE. The PGW may optionally include information about what IP flow handovers are accepted/rejected.

Step 7: The UE and the PGW move the affected IP flows to the target access.

Alternative 2

In this case the UE discards the IP flow handover information when the RAN Rule for moving traffic to WLAN is not satisfied. The PGW may re-try the IP flow handover at a later stage by sending another IP flow handover request for this IP flow to the UE.

The call flow for this option is the same as the call flow in FIG. 5, steps 7-10. In addition steps 5 and 6 are performed but these may be done asynchronously and may take place continuously and at any time as described below FIG. 5.

Signaling IP Flow Handover Request Allowing RAN Control

In the currently discussed NBIFOM solution, each IP flow handover request indicates a target access type. The access type may e.g. be included explicitly in a Routing Rule. Alternatively the access type may be indicated implicitly to be the access type over which the IP flow mobility handover request is sent; for example if the IP flow handover request is sent by the UE to PGW via WLAN access it is interpreted as a request for moving the corresponding IP flow to WLAN access.

In the description above it has been assumed that if the PGW provides a Routing Rule with access type WLAN, or a default access type WLAN, then the corresponding traffic shall be routed over WLAN if the RAN Rules for moving traffic to WLAN are fulfilled. However, in a solution where NBIFOM is applied together with RAN Rules, there are different options for how to control in more detail from the core network whether the RAN Rules shall be taken into account or not. Three options are described below.

There are different options for how to indicate to the UE that RAN Rules shall be taken into account for NBIFOM. The options include:

1. No special indication is used. The UE applies the RAN Rules when evaluating the target access type. This is the solution used in at least the subheadings 'General principles', 'Call flow for receiving the IP flow handover request in the UE', and 'Handling of the case where the RAN rule for moving traffic to WLAN is not satisfied'.

2. An indication per PDN Connection is used to control whether the RAN Rules shall be evaluated or not when using NBIFOM.

3. And indication per IP Flow handover request is used to control whether the RAN Rules shall be evaluated for a specific IP flow handover The options are further detailed below:

Option 1: In order to take the "RAN Rules" evaluation into account when performing IP flow mobility, the same type of IP flow handover request can be used as for NBIFOM in general, i.e. either using an explicit access type in a Routing Rules or by using access type over which the IP flow mobility request is sent. If the PGW sends an IP flow handover request for handing over a flow to WLAN, the IP flow shall only be moved if the RAN Rule for moving traffic to WLAN is satisfied. In this way the RAN Rule becomes a condition to the Routing Rule provided by the PGW. When receiving a IP Flow handover request for moving traffic to 3GPP access, the UE shall move the IP flow to 3GPP access independent of the RAN Rule status.

Option 2: As an additional capability in option 1, the network (e.g. PGW) may provide an indication to the UE in order to control whether RAN Rules will be applied or not with NBIFOM. For example, at PDN Connection setup when the use of NBIFOM is negotiated, the PGW may provide an indication to the UE whether RAN Rules shall be taken into account or not. The UE only considers the RAN Rules when NBIFOM is used in case the use of RAN Rules with NBIFOM is negotiated.

Option 3: As an alternative, an IP flow handover request (e.g. Routing Rule) comprises an explicit indication that the access type to be used for the IP Flow is to be determined by the "RAN rule". The IP flow handover request may also comprises a "default" access type, or list of access types in priority order, that is used when RAN Assistance Parameters are not available, e.g. in case the UE is camping on GERAN access or on a base station that does not support RAN Assistance Parameters. In addition the UE and PGW will negotiate a default access type that is used for IP flows that do not match a specific Routing Rule. With this option the default access could be set to 3GPP, or the UE and PGW negotiate that the default access is to be determined by the "RAN Rule". A Routing Rule may in this case comprise:
- IP filters describing the IP flow,
  - a precedence indicating what IP filters have precedence in case of IP filters in different routing rules are overlapping.
  - an indication that access type is determined by the "RAN Rules"
  - (optionally) an access type, or list of access types, describing what access shall be used for the IP flow in case the RAN does not provide traffic steering information It would also be possible that the above options for sending indication are used by the UE to determine whether to apply another WLAN/3GPP interworking procedure, i.e. other than the RAN rules. For example, it would be possible to apply the above options to determine whether the UE shall consider a traffic steering command based interworking procedure.

The indication may be specifically associated with a certain interworking procedure, e.g. one indication is used to indicate whether the UE shall apply the RAN rule-based procedure, while another indication is used to indicate whether the UE shall apply the traffic steering command based procedure.

It would also be possible that a common indication is used to indicate whether the UE may apply either the RAN rule based mechanism or the traffic steering command based mechanism. I.e. if the UE considers that it has received the indication the UE would consider either the RAN rules based procedure or the traffic steering command based procedure (whichever is currently applied by the UE).

Example Node Configurations

Figure 7:
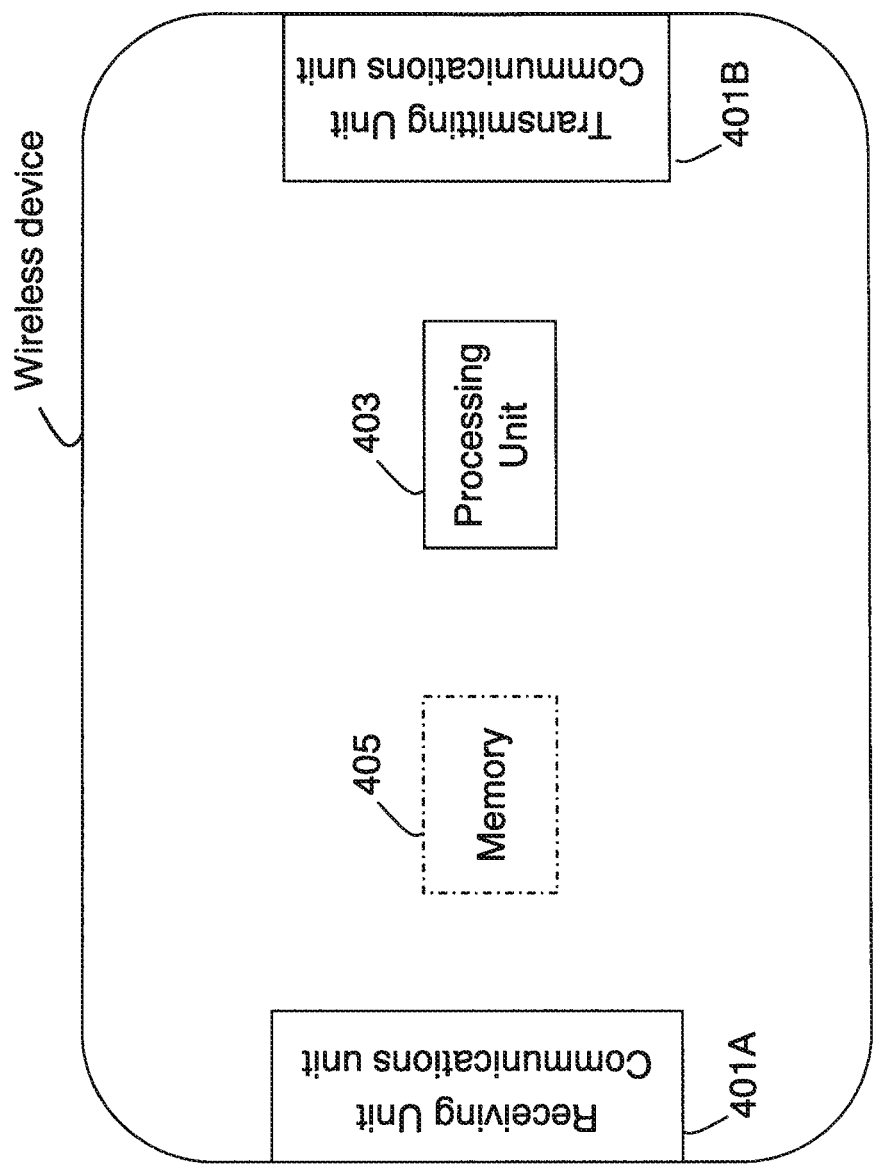
FIG. 7 is an example node configuration of wireless device, according to some of the example embodiments presented herein.

FIG. 7 illustrates an example node configuration of a wireless device. The wireless device may perform some of the example embodiments described herein. The wireless device may comprise a receiving unit/communications unit 401A and a transmitting unit/communications unit 401B. The receiving and transmitting units may be in the form of radio circuitry, a module, or a communication port that may be configured to receive and/or transmit communication data, instructions, and/or messages. It should be appreciated that the receiving and transmitting units may be comprised as any number of transceiving, receiving, and/or transmitting units, modules, or circuitry. It should further be appreciated that the receiving and transmitting units may be in the form of any input or output communications port known in the art. The receiving and transmitting units may comprise RF circuitry and baseband processing circuitry (not shown).

The wireless device may also comprise a processing unit, module or circuitry 403 which may be configured to manage a data flow between networks of two different access types as described herein. The processing unit 403 may be any suitable type of computation unit, for example, a microprocessor, digital signal processor (DSP), field programmable gate array (FPGA), or application specific integrated circuit (ASIC), or any other form of circuitry.

The wireless device may further comprise a memory unit, module, or circuitry 405 that may be any suitable type of computer readable memory and may be of volatile and/or non-volatile type. The memory 405 may be configured to store received, transmitted, and/or measured data, device parameters, communication priorities, routing rules, RAN assistance parameters, any information related to access types and/or executable program instructions.

Figure 8:
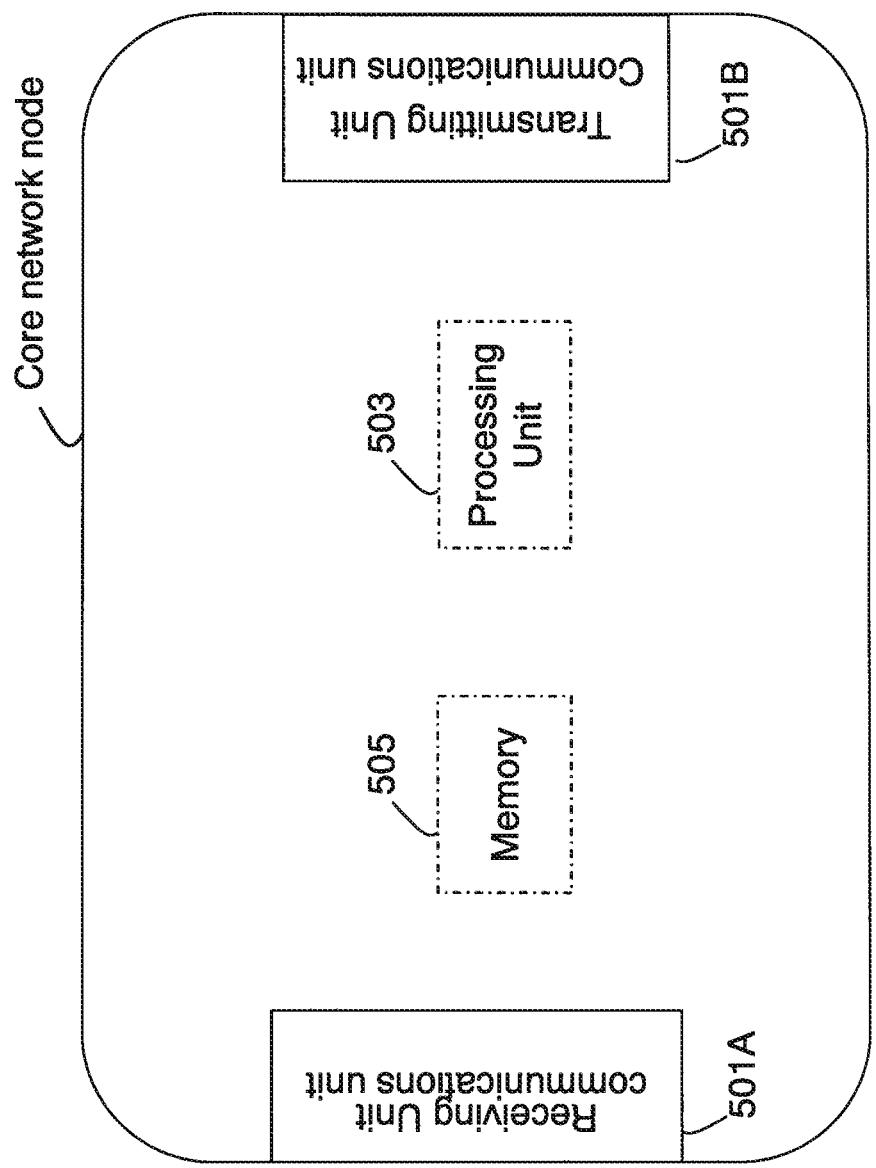
FIG. 8 is an example node configuration of a core network node, according to some of the example embodiments presented herein.

FIG. 8 illustrates an example node configuration of a core network node. According to some of the example embodiments, the core network node may be a PGW or a PCRF, or any other core network node. The core network node may perform some of the example embodiments described herein. The core network node may comprise a receiving unit/communications unit 501A and a transmitting unit/communications unit 501B. The receiving and transmitting units may be in the form of radio circuitry, a module, or a communication port that may be configured to receive and/or transmit communication data, instructions, and/or messages. It should be appreciated that the receiving and transmitting units may be comprised as any number of transceiving, receiving, and/or transmitting units, modules, or circuitry. It should further be appreciated that the receiving and transmitting units may be in the form of any input or output communications port known in the art. The receiving and transmitting units may comprise RF circuitry and baseband processing circuitry (not shown).

The core network node may also comprise a processing unit, module or circuitry 503 which may be configured to manage a data flow of a wireless device between networks of two different access types as described herein. The processing unit 503 may be any suitable type of computation unit, for example, a microprocessor, digital signal processor (DSP), field programmable gate array (FPGA), or application specific integrated circuit (ASIC), or any other form of circuitry.

The core network node may further comprise a memory unit, module, or circuitry 505 that may be any suitable type of computer readable memory and may be of volatile and/or non-volatile type. The memory 505 may be configured to store received, transmitted, and/or measured data, device parameters, communication priorities, routing rules, RAN assistance parameters, any information related to access types and/or executable program instructions.

Example Node Operations

Figure 9A:
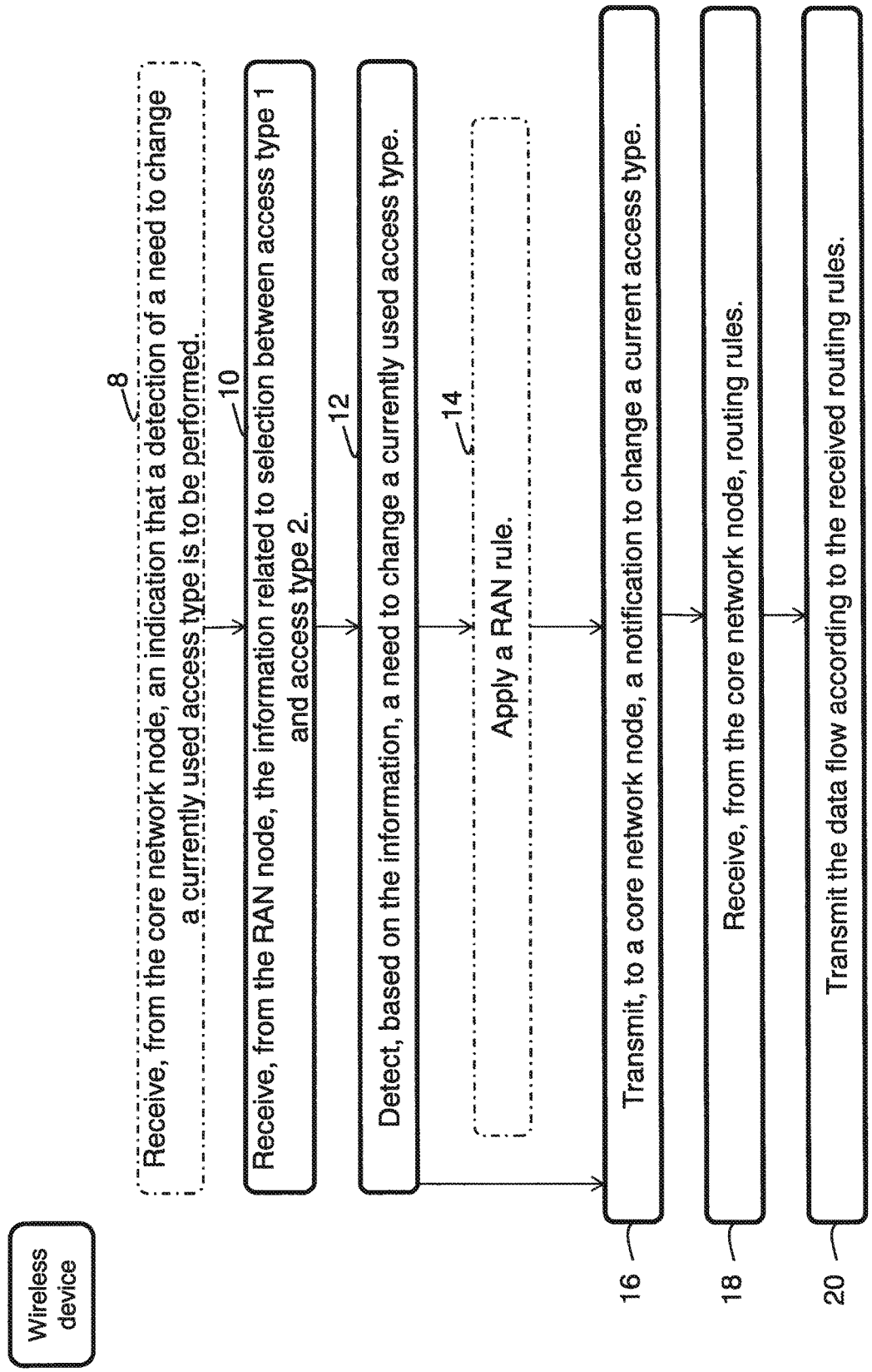
FIGS. 9A and 9B is a flow diagram of example operations, and corresponding modules, respectively, that may be taken by the wireless device of FIG. 7, according to some of the example embodiments presented herein.

FIG. 9A is a flow diagram depicting example operations that may be taken by a wireless device as described herein for managing a data flow of a wireless device between networks of different access types. It should also be appreciated that FIG. 9A comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination. The numerals referred to in FIG. 9A correspond to the numerals referred to in the non-limiting summary of some of the example embodiments.

Figure 9B:
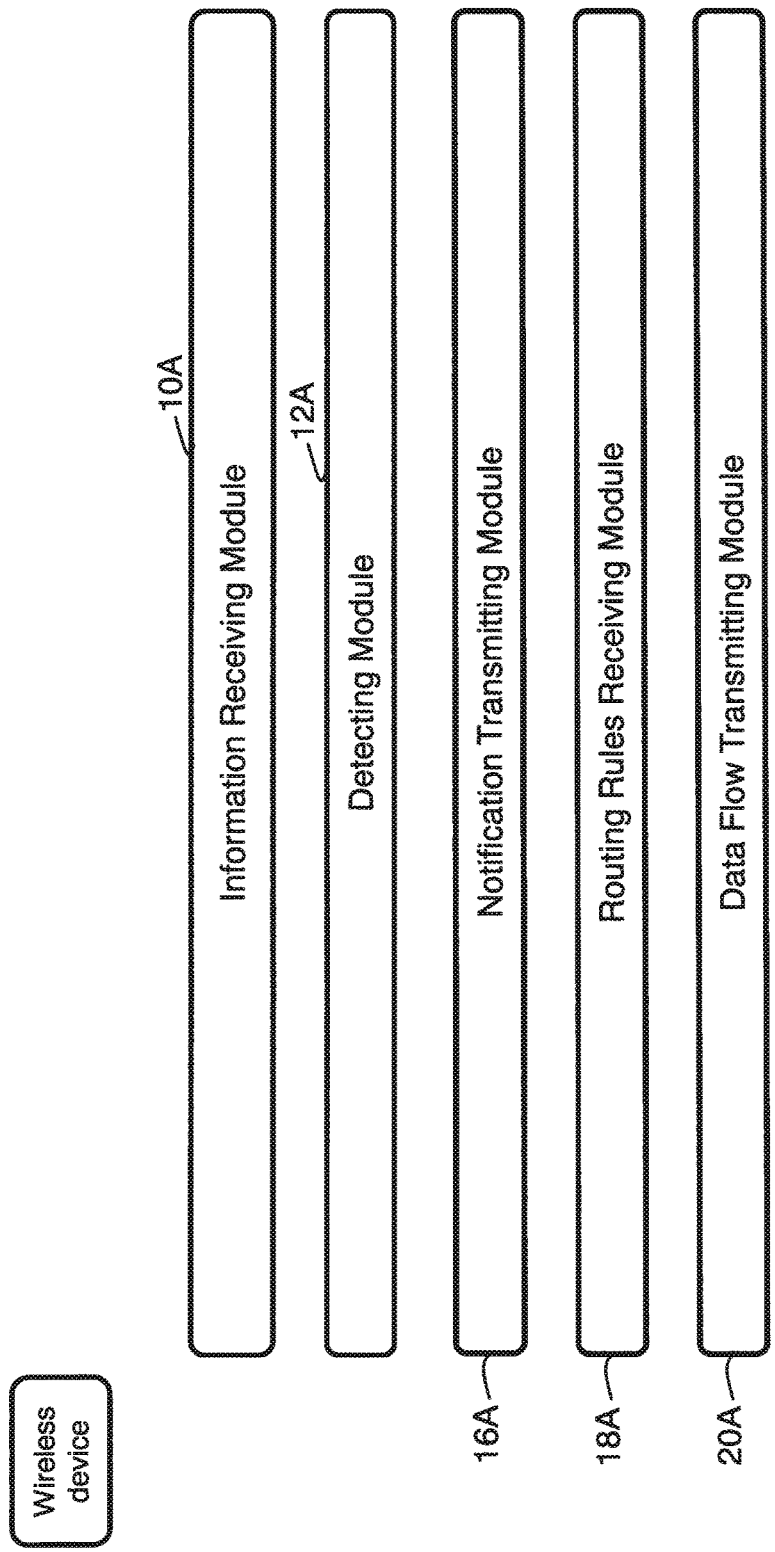

FIG. 9B is a module diagram of various modules that may be utilized in the performance of the operations of FIG. 9A.

It should be appreciated that the example node operations highlight the embodiments discussed as alternate 2 under the heading 'Overview of the example embodiments'. These embodiments are further discussed as 1.(a)(i). Alt 1a.1 and 2.(a)(i). Alt 2a.1 under the subheading 'General principles'. Embodiments of FIGS. 9A and 9B are also discussed under the subheading 'Signaling IP flow handover request allowing RAN control', in particular option 2 under this subheading.

Example Operation 8

According to some of the example embodiments, the wireless device is configured to receive 8, from the core network node, an indication that the wireless device may detect if a currently used access type will need to be changed. The communications unit 401A is configured to receive, from the core network node, the indication.

According to some of the example embodiments, the indication may serve as an indication that the wireless device is to engage in the example embodiments described herein. According to some of the example embodiments, the indication is provided during a PDN connection set up.

Operation 10

The wireless device is configured to receive 10, from a RAN node, information related to the selecting between access types 1 and 2. The communications unit 401A is configured to receive, from the RAN node, the information related to the selecting between access types 1 and 2. The information receiving module 10A is configured to perform operation 10.

According to some of the example embodiments, the information received by the RAN node comprises threshold level parameters for access types 1 and 2 based metrics. According to some of the example embodiments, these threshold level parameters are RAN assistance parameters.

Operation 12

The wireless device is configured to detect 12, based on the information received, a need to change an access type currently in use by the wireless device. The processing unit 403 is configured to detect, based on the information received, the need to change the access type currently in use by the wireless device. The detecting module 12A is configured to perform operation 12.

According to some of the example embodiments, a few example combinations of access types may be:
Access type 1: 3GPP, Access type 2: WLAN
Access type 1: 3GPP, Access type 2: fixed access (e.g., DSL, Fiber)
Access type 1: 3GPP, Access type 2: CDMA Example Operation 14

According to some of the example embodiments, the information comprises RAN assistance parameters comprising threshold level parameters for access types 1 based metrics, access types 2 based metrics, or both. According to such example embodiments the detecting 12 further comprises applying 14a RAN rule.

According to other example embodiments, the information comprises a traffic steering command for changing an access type currently in use by the wireless device. Such example embodiments are further described under at least the subheading 'Traffic Steering Command based approach' as well as under the subheading 'Signaling IP flow handover request allowing RAN control'.

Operation 16

The wireless device is also configured to transmit 16, to a core network node, a notification to change a current access type of access types 1 and 2. The communications unit 401B is configured to transmit, to the core network node, the notification. The notification transmitting module 16A is configured to perform operation 16.

Operation 18

The wireless device is configured to receive 18, from the core network node, routing rules. The routing rules comprising at least an IP filter indicating an identified access type, of access type 1 or 2, for an identified data flow. The communications unit 401A is configured to receive, from the core network node, the routing rules. The routing rules receiving module 18A is configured to perform operation 18.

Operation 20

The wireless device is configured to transmit 20 the data flow according to the received routing rules. The communications unit 401B is configured to transmit the data flow according to the received routing rules. The data flow transmitting module is configured to perform operation 20.

Figure 10A:
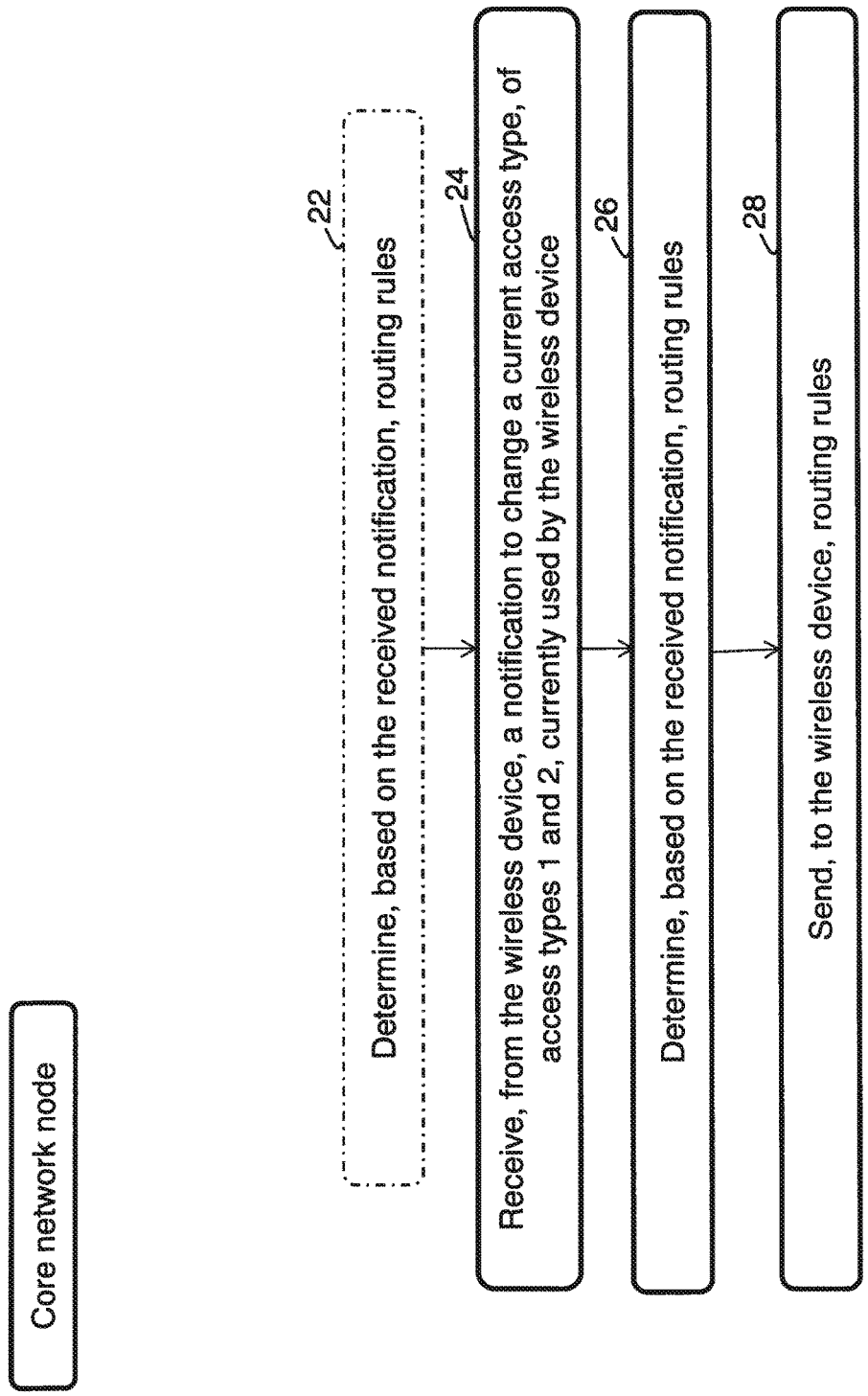
FIGS. 10A and 10B is a flow diagram of example operations, and corresponding modules, respectively, that may be taken by the core network node node of FIG. 8, according to some of the example embodiments presented herein.

FIG. 10A is a flow diagram depicting example operations that may be taken by a core network node as described herein for managing a data flow of a wireless device between networks of different access types. It should also be appreciated that FIG. 10A comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination. The numerals referred to in FIG. 9A correspond to the numerals referred to in the non-limiting summary of some of the example embodiments.

Figure 10B:
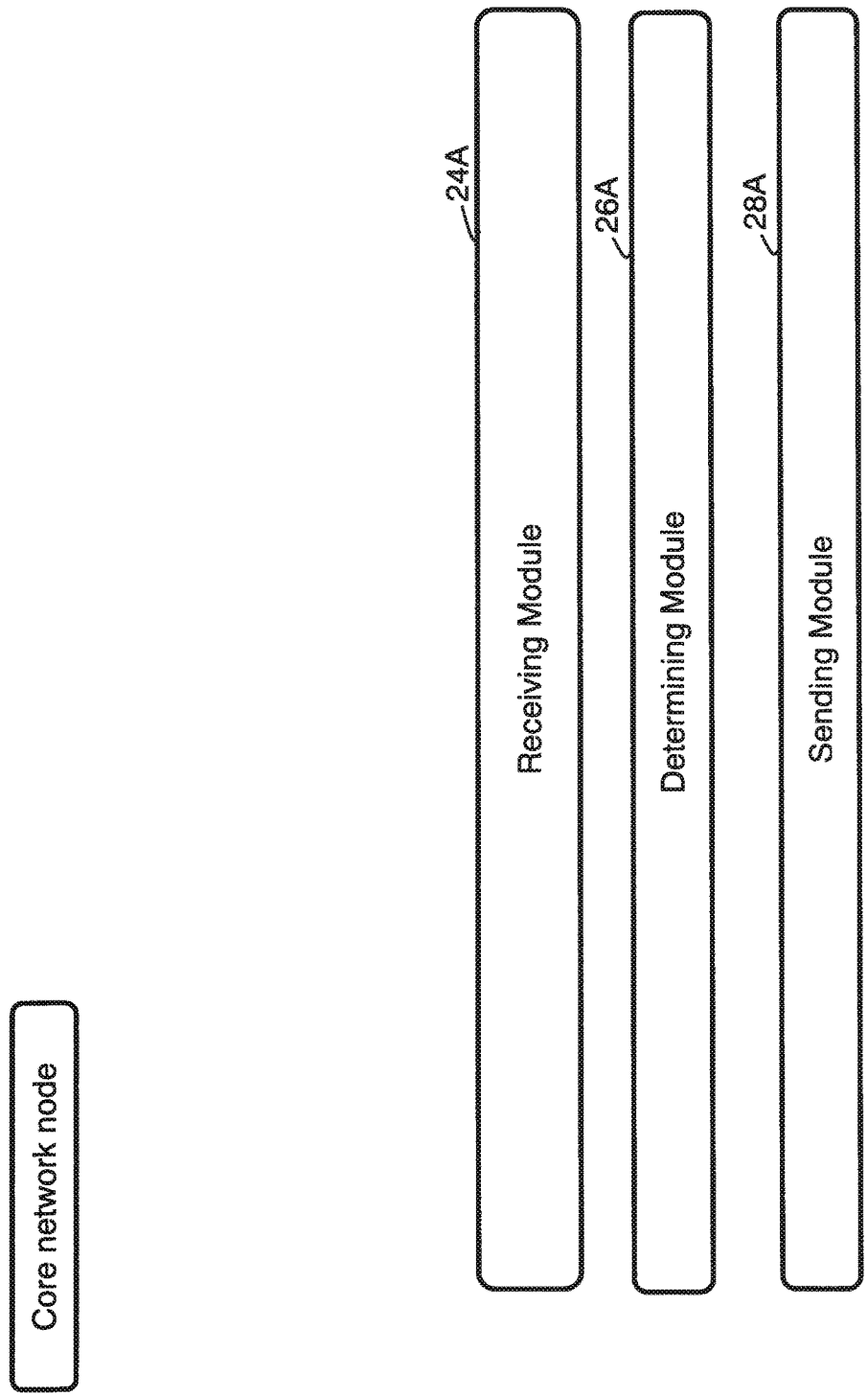

FIG. 10B is a module diagram of various modules that may be utilized in the performance of the operations of FIG. 10A. It should be appreciated that the example node operations discussed highlight the embodiments discussed as alternate 2 under the heading 'Overview of the example embodiments'. These embodiments are further discussed as 1.(a)(i). Alt 1a.1 and 2.(a)(i). Alt 2a.1 under the subheading 'General principles'. Embodiments of FIGS. 9A and 9B are also discussed under the subheading 'Signaling IP flow handover request allowing RAN control', in particular option 2 under this subheading.

It should be appreciated that the core network node may be a PGW, PCRF or any other core network node which is able to send routing rules.

Example Operation 22

According to some of the example embodiments, the core network node may be configured to send 22, to the wireless device, an indication that a detection of a need to change an access type of at least a portion of the data flow is to be performed. The communications unit 501B is configured to send, to the wireless device, the indication that the detection of the need to change the access type of at least a portion of the data flow is to be performed.

According to some of the example embodiments, the indication may serve as an indication that the wireless device is to engage in the example embodiments described herein. According to some of the example embodiments, the indication is provided during a PDN connection set up.

Operation 24

The core network node is configured to receive 24, from the wireless device, a notification to change a current access type, of access types 1 and 2, currently used by the wireless device. The communications unit 501A is configured to receive, from the wireless device, the notification to change the current access type currently used by the wireless device. The receiving module 24A is configured to perform operation 24.

Operation 26

The core network node is configured to determine 26, based on the received notification, routing rules comprising an IP filter indicating an identified access type, of access types 1 and 2, for an identified data flow. The processing unit 503 is configured to determine, based on the received notification, routing rules. The determining module 26A is configured to perform operation 26.

Operation 28

The core network node is configured to send 28, to the wireless device, the routing rules. The communications unit 501B is configured to send, to the wireless device, the routing rules. The sending module 28A is configured to perform operation 28.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Also note that terminology such as user equipment should be considered as non-limiting. A device or user equipment as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. It should be appreciated that the term user equipment may also comprise any number of connected devices. Furthermore, it should be appreciated that the term 'user equipment' shall be interpreted as defining any device which may have an internet or network access.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method performed by a wireless device, wherein the wireless device is connectable to both a Third Generation Partnership Program (3GPP) access network and a Wireless Local Area Network (WLAN), the method comprising:
   the wireless device receiving, from a radio access network (RAN) node within a radio access network, RAN assistance information related to a selection between the 3GPP access network and the WLAN;
   based on the RAN assistance information, an access stratum of the wireless device indicating move traffic to WLAN;
   as a result of the access stratum of the wireless device indicating move traffic to WLAN, the wireless device triggering a Packet Data Network (PDN) Gateway (PGW) within a core network to provide a routing rule to the wireless device, wherein triggering the PGW to provide the routing rule comprises the wireless device transmitting a notification indicating that the access stratum of the wireless device has indicated move traffic to WLAN based on the received RAN assistance information, wherein the PGW is remote from the RAN node and provides connectivity for the wireless device to a PDN, wherein the notification indicating that the access stratum of the wireless device has indicated move traffic to WLAN does not identify any data flows and does not contain any routing rule identifiers (RIDs);

after transmitting the notification, receiving, from the PGW, the routing rule, the routing rule comprising an Internet Protocol (IP) filter identifying a data flow and indicating an access type for the identified data flow, wherein the access type for the identified data flow is WLAN; and transmitting IP packets belonging to the data flow according to the received routing rule.

2. The method of claim 1, wherein the received RAN assistance information comprises RAN assistance parameters.

3. The method of claim 2, wherein RAN assistance parameters comprises threshold level parameters for access type 1 based metrics, access type 2 based metrics, or both.

4. The method of claim 1, wherein the received RAN assistance information comprises a traffic steering command for changing an access type currently in use by the wireless device.

5. A wireless device, wherein the wireless device is connectable to both a Third Generation Partnership Program (3GPP) access network and a Wireless Local Area Network (WLAN), the wireless device comprising:

a transmitter;

a receiver for receiving radio access network (RAN) assistance information transmitted by a RAN node, the RAN assistance information being related to a selection between the 3GPP access network and the WLAN; and processing circuitry, wherein the processing circuitry is configured to cause the wireless device to:

based on the RAN assistance information, indicate move traffic to WLAN;

as a result of indicating move traffic to WLAN, trigger a Packet Data Network (PDN) Gateway (PGW) within a core network to provide a routing rule to the wireless device, wherein triggering the PGW to provide the routing rule comprises the wireless device transmitting a notification indicating that an access stratum of the wireless device has indicated move traffic to WLAN based on the received RAN assistance information, wherein the PGW is remote from the RAN node and provides connectivity for the wireless device to a PDN, wherein the notification does not identify any data flows and does not contain any routing rule identifiers (RIDs);

after transmitting the notification, receive, from the PGW, the routing rule, the routing rule comprising an Internet Protocol (IP) filter identifying a data flow and indicating an access type for the identified data flow, wherein the access type for the identified data flow is WLAN; and transmit IP packets belonging to the data flow according to the received routing rule.

6. The wireless device of claim 5, wherein the received RAN assistance information comprises RAN assistance parameters.

7. The wireless device of claim 6, wherein the RAN assistance parameters comprises threshold level parameters for access type 1 based metrics, access type 2 based metrics, or both.

8. The wireless device of claim 5, wherein the received RAN assistance information comprises a traffic steering command for changing an access type currently in use by the wireless device.

9. A method, in a Packet Data Network (PDN) Gateway (PGW) within a core network, for managing a data flow of a wireless device between a network of access type 1 and a network of access type 2, wherein the wireless device is connectable to both the networks of access types 1 and 2, the method comprising:

the PGW within the core network receiving, from the wireless device, a notification indicating that an access stratum of the wireless device indicates move traffic to wireless local area network (WLAN), wherein the notification does not identify any data flows; and in response to receiving the notification indicating that the access stratum of the wireless device indicates move traffic to WLAN, the PGW sending to the wireless device, via a radio access network (RAN) node, a response message, the response message comprising a new routing rule generated by the PGW after the PGW received the notification, wherein the new routing rule comprises an Internet Protocol (IP) filter identifying a data flow and indicating an access type for the identified data flow, said indicated access type for the identified data flow being one of the access type 1 and the access type 2.

10. The method of claim 9, wherein the notification also does not contain any routing rule identifiers (RIDs).

11. A Packet Data Network (PDN) Gateway (PGW) within a core network for managing a data flow of a wireless device between a network of access type 1 and a network of access type 2, wherein the wireless device is connectable to both the networks of access types 1 and 2, the PGW comprising:

a transmitter;

a receiver for receiving from the wireless device a notification indicating that an access stratum indicates move traffic to wireless local area network (WLAN), wherein the notification does not identify any data flows; and processing circuitry configured to cause the PGW to:

generate a new routing rule for the wireless device after receiving from the wireless device the notification indicating that the access stratum indicates move traffic to WLAN, the new routing rule comprising an Internet Protocol (IP) filter identifying a data flow and indicating an access type for the identified data flow, said indicated access type for the identified data flow being one of the access type 1 and the access type 2; and employ the transmitter to transmit the new routing rule to the wireless device via a radio access network (RAN) node.

12. The PGW of claim 11, wherein the notification also does not contain any routing rule identifiers (RIDs).

13. The method of claim 1, wherein the routing rule received from the PGW is a new routing rule generated by the PGW after receiving the notification transmitted by the wireless device.

14. The method of claim 1, wherein the new routing rule is generated by updating an existing routing rule.

* * * * *